United States Patent
Tanada et al.

(10) Patent No.: US 6,788,371 B2
(45) Date of Patent: Sep. 7, 2004

(54) SEMITRANSPARENT REFLECTIVE LIQUID CRYSTAL DISPLAY DEVICE HAVING DECREASED NUMBER OF PHASE DIFFERENCE AND POLARIZING PLATES AND HAVING REFLECTOR WITH CONCAVE PORTIONS ON OUTER SURFACE OF TRANSPARENT SUBSTRATE

(75) Inventors: Tetsushi Tanada, Fukushima-ken (JP); Mitsuo Ohizumi, Fukushima-ken (JP); Mitsuru Kano, Fukushima-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/201,479

(22) Filed: Jul. 23, 2002

(65) Prior Publication Data

US 2003/0086039 A1 May 8, 2003

(30) Foreign Application Priority Data

Jul. 27, 2001 (JP) ........................................ 2001-228658

(51) Int. Cl.[7] ............................................ G02F 1/1335
(52) U.S. Cl. ....................... 349/119; 349/117; 349/118; 349/96; 349/113
(58) Field of Search ........................... 349/117–120, 96, 349/113–114

(56) References Cited

U.S. PATENT DOCUMENTS

| | | | |
|---|---|---|---|
| 6,219,120 B1 | | 4/2001 | Sasaki et al. ................ 349/113 |
| 6,219,122 B1 | * | 4/2001 | Uchida et al. ............... 349/117 |
| 6,429,919 B1 | * | 8/2002 | Takatsuka et al. ........... 349/113 |
| 6,476,890 B1 | * | 11/2002 | Funahata et al. ............ 349/113 |
| 6,606,139 B2 | * | 8/2003 | Yoshii et al. ................ 349/114 |
| 2001/0055082 A1 | * | 12/2001 | Kubo et al. ................. 349/114 |

\* cited by examiner

*Primary Examiner*—Tarifur R. Chowdhury
(74) *Attorney, Agent, or Firm*—Brinks Hofer Gilson & Lione

(57) ABSTRACT

A liquid crystal display device has a pair of transparent substrates facing each other with a liquid crystal layer therebetween. First and second phase difference plates and a first polarizing plate are formed sequentially on one of the transparent substrates, while a reflector, a third phase difference plate, and a second polarizing plate are formed sequentially on the other of the transparent substrates. The reflector is a metal reflection film on a base material with concave portions formed thereon. The metal reflection film includes a plurality of concave surfaces corresponding to the concave portions that face the transparent substrate. The thickness of the metal reflection film is within the range of 5 to 50 nm.

50 Claims, 13 Drawing Sheets

SEMITRANSPARENT REFLECTIVE LIQUID CRYSTAL DISPLAY DEVICE HAVING DECREASED NUMBER OF PHASE DIFFERENCE AND POLARIZING PLATES AND HAVING REFLECTOR WITH CONCAVE PORTIONS ON OUTER SURFACE OF TRANSPARENT SUBSTRATE

BACKGROUND OF THE INVENTION

1. Field of the Invention

The present invention relates to a liquid crystal display device of external type in which a reflector is placed on the outer surface side of a liquid crystal panel.

2. Description of the Related Art

Regarding cellular phones and portable data terminals at present, liquid crystal display devices are mounted on almost all products. Recently, semitransparent reflective liquid crystal display devices have been mounted on most of these portable electronic devices.

The semitransparent reflective liquid crystal display device is provided with a reflection plate for reflecting light incident from an outside on the internal side or external side of a pair of transparent substrates constituting the liquid crystal display device, is further provided with a backlight on the back side thereof and, therefore, can be used while a reflective mode as a reflective liquid crystal display device using sunlight or an external illumination as a light source and a transmissive mode as a transmissive liquid crystal display device using light from the backlight as a light source are switched.

FIG. 19 is a diagram showing an example of the partial sectional structure of a conventional semitransparent reflective liquid crystal display device. This semitransparent reflective liquid crystal display device 50 includes a liquid crystal panel 50a having a configuration in which transparent electrode layers 53 and 54 are placed on respective counter-surface sides of a pair of glass substrates 51 and 52, liquid crystal orientation films 55 and 56 are further placed on these transparent electrode layers 53 and 54, respectively, and a liquid crystal layer 57 are placed between these orientation films 55 and 56.

A first phase difference plate 66 and a first polarizing plate 68 are laminated on the external side of one glass substrate 51 in that order from the substrate 51 side. A second phase difference plate 67 and a second polarizing plate 69 are placed sequentially on the external side of the other glass substrate 52, and a reflection plate 70 is attached on the external side of the second polarizing plate 69 with a transparent adhesive layer 70a therebetween.

In FIG. 19, reference numeral 65 denotes a sealing member for encapsulating the liquid crystal layer 57 between the glass substrates 51 and 52, and reference numeral 75 denotes a backlight placed on the underside of the reflection plate.

As shown in FIG. 19 and FIG. 20, for example, a concave and convex surface is formed on the surface of a resin film 71, a semitransparent reflection film 72 made of aluminum, etc., is further formed on this concave and convex surface using an evaporation method, etc., and, therefore, the reflection plate 70 is configured. The film thickness of this semitransparent reflection film 72 is specified to be within the range of 5 to 50 nm, and a part of light from the backlight 75 can be transmitted. This reflection plate 70 is attached while the surface on the semitransparent reflection film 72 side is faced toward the second polarizing plate 59 side.

The semitransparent reflective liquid crystal display device 50 having the aforementioned configuration is used as, for example, a display portion of a cellular phone. This semitransparent reflective liquid crystal display device 50 is operated in the reflective mode without lighting up of the backlight 75 when adequate external light is available and is operated in the transmissive mode with the backlight 75 being operated under circumstances where the external light is not available.

In the reflective mode, the light incident upon the first polarizing plate 68 is linearly polarized by this polarizing plate 68, and the polarized light is elliptically polarized by passing through the first phase difference plate 66, the liquid crystal layer 57, and the second phase difference plate 67. This elliptically polarized light is linearly polarized by passing through the second polarizing plate 69. This linearly polarized light is reflected at the reflection plate 70, is passed again through the second polarizing plate 69, the second phase difference plate 67, the liquid crystal layer 57, and the first phase difference plate 66, and is emitted from the first polarizing plate 68.

In the transmissive mode, the light emitted from the backlight 75 and passed through the semitransparent reflection film 72 is linearly polarized by the second polarizing plate 69, the polarized light is elliptically polarized by passing through the second phase difference plate 67, the liquid crystal layer 57, and the first phase difference plate 66. This elliptically polarized light is linearly polarized by passing through the first polarizing plate 68, and is emitted from the first polarizing plate 68.

Meanwhile, as display performances of liquid crystal display devices, in general, it is required that (1) resolution, (2) contrast, (3) luminance of screen, (4) visibility, for example, viewing angle of wide range, and the like are excellent.

However, regarding the conventional semitransparent reflective liquid crystal display device 50, since the second polarizing plate 69 has been placed between the reflection plate 70 and the liquid crystal panel 50a, in the reflective mode, problems arise as the incident light passes through the second polarizing plate 69 twice. These problems include the whole screen of the semitransparent reflective liquid crystal display device 50 becomes light green due to degradation of the spectral characteristic, contrast of the screen degrades and visibility is reduced.

Regarding the conventional semitransparent reflective liquid crystal display device 50, since the reflection efficiency of the reflection plate 70, on which the concave and convex surface has been formed, is reduced, the reflectance is reduced as a whole and, therefore, the need of the reflection plate for reflecting the incident light at a reflection angle of wider range is not adequately met. Consequently, regarding the semitransparent reflective liquid crystal display device 50 provided with the reflection plate 70 of this sort, problems arise in that the viewing angle is within the relatively narrow range of about 25 to 35 degrees and the luminance of the screen is not adequate.

Regarding the conventional semitransparent reflective liquid crystal display device 50, since the phase difference plates and the polarizing plates is provided by two plates, respectively, the number of parameters of various optical characteristics is increased and, therefore, optimization of each parameter is complicated. Especially, in the transmissive mode, the increase in luminance and the improvement in contrast of the screen is difficult to achieve.

Consequently, it is considered that the second phase difference plate 67 and the second polarizing plate 69 are removed, the first phase difference plate 68 is made of a laminated plate of two layers exhibiting two different optical characteristics as the phase difference plate, only one plate of the first polarizing plate 68 placed on the first phase difference plate 66 is used as the polarizing plate and, therefore, the white display is lightened when the selection voltage is applied. However, in such a semitransparent reflective liquid crystal display device, since the change merely consists of reducing both of the phase difference plate and the polarizing plate by one plate, the reflection efficiency of the reflection plate 70 remains poor. This means that both the light display and the dark display (black display) are lightened and, therefore, the contrast is reduced.

SUMMARY OF THE INVENTION

The present invention has been made in consideration of the aforementioned circumstances. Accordingly, it is an object of the present invention to provide a liquid crystal display device in which no phase difference plate and no polarizing plate are placed between a liquid crystal panel and a reflector placed on the outer surface side thereof and which has a wide viewing angle, high luminance, and high contrast.

In order to achieve the aforementioned object, the present invention has adopted the following configuration.

A liquid crystal display device according to the present invention is provided with a liquid crystal cell, in which a transparent electrode and an orientation film are placed on the inner surface side of one transparent substrate (a first transparent substrate) of/a pair of transparent substrates facing each other with a liquid crystal layer therebetween in that order from the one transparent substrate side, and a transparent electrode and an orientation film are placed on the inner surface side of the other transparent substrate (a second transparent substrate) in that order from the other transparent substrate side, first and second phase difference plates and a first polarizing plate formed sequentially on the outer surface side of the other transparent substrate, a reflector attached on the outer surface side of the one transparent substrate with an adhesive layer therebetween, and a third phase difference plate and a second polarizing plate formed sequentially on the outer surface side of the one transparent substrate more distal to the liquid crystal cell than the reflector. The reflector includes a metal reflection film formed on a base material. The base material has a surface with a plurality of concave portions. The metal reflection film includes a plurality of concave surfaces corresponding to the concave portions. The metal reflection film is attached to the liquid crystal cell, is more proximate to the first transparent substrate than the base material, and has a thickness of 5 to 50 nm.

According to such a liquid crystal display device, since the second polarizing plate is placed on the external side of the reflector including the metal reflection film having a film thickness of 5 to 50 nm, in a reflective mode, incident light is reflected by the metal reflection film and does not pass through the second polarizing plate and, therefore, spectral characteristics are not degraded, the color of the screen of the liquid crystal display device can be brought close to white, and the contrast ratio of the screen is improved so that it becomes possible to improve the visibility. In a transmissive mode, since light emitted from a backlight passes through the third phase difference plate and the second polarizing plate, passes through the metal reflection film as well and, furthermore, passes through the liquid crystal layer, the first and second phase difference plates, and the first polarizing plate, the light display (white display) is lightened while the dark display (black display) is darkened and, therefore, it becomes possible to improve the contrast ratio.

In particular, since the reflector is configured by forming the metal reflection film on the base material with the plurality of concave portions formed on the surface while the metal reflection film includes the plurality of concave surfaces corresponding to the concave portions, light condensing function is enhanced compared to that of the conventional reflection plate including concavities and convexities on the surface and, therefore, the reflectance can be increased. According to this, the light display in the reflective mode is lightened, the luminance and contrast ratio are improved and, therefore, superior display characteristics can be achieved.

Regarding the liquid crystal display device according to the present invention, the reflector is placed on the external side of the liquid crystal cell, and when the reflector is attached on the liquid crystal cell, adhesion can be performed at ambient temperature. Consequently, when the liquid crystal cell and the reflector are manufactured separately and, thereafter, the reflector is retrofitted to this liquid crystal cell, since thermal stress is not applied to the liquid crystal cell during manufacture of the reflector, and agents, etc., used during manufacture of the reflector do not fall on the liquid crystal cell, degradation of the liquid crystal cell can be prevented.

Preferably, the liquid crystal layer has a helical structure twisted 240 degrees to 250 degrees in the direction of the thickness thereof, the retardation ($\Delta nd_{LC}$) of the liquid crystal cell is 600 nm to 800 nm, when the orientation direction a of the orientation film on the other transparent substrate side and the orientation direction b of the orientation film on the one transparent substrate side are viewed from the incident side of light, and the normal direction X between the orientation directions a and b passes at an angle half the interior angle formed by the cross-point O of the orientation directions a and b and the orientation directions a and b, the retardation ($\Delta nd_{RF1}$) of the first phase difference plate adjacent to the other transparent substrate is 100 nm to 200 nm, an angle ($\phi_{RF1}$), which a lagging phase axis β of the first phase difference plate forms with respect to the normal direction X, is 60 degrees to 100 degrees counterclockwise when viewed from the incident side of the light, the retardation ($\Delta nd_{RF2}$) of the second phase difference plate adjacent to the first polarizing plate is 300 nm to 500 nm, an angle ($\phi_{RF2}$), which a lagging phase axis γ of the second phase difference plate forms with respect to the normal direction X, is 90 degrees to 140 degrees counterclockwise when viewed from the incident side of the light, the retardation ($\Delta nd_{RF3}$) of the third phase difference plate adjacent to the one transparent substrate is 132.5 nm to 142.5 nm, an angle ($\phi_{RF3}$), which a lagging phase axis δ of the third phase difference plate forms with respect to the normal direction X, is 80 degrees to 110 degrees counterclockwise when viewed from the incident side of the light, an angle ($\phi_{pol1}$), which an absorption axis α of the first polarizing plate forms with respect to the normal direction X, is 20 degrees to 70 degrees or 110 degrees to 160 degrees counterclockwise when viewed from the incident side of the light, and an angle ($\phi_{pol2}$), which an absorption axis ε of the second polarizing plate forms with respect to the normal direction X, is 23 degrees to 43 degrees counterclockwise when viewed from the incident side of the light.

In a liquid crystal display device with the above characteristics, the white display (light display) is further lightened and, therefore, it becomes possible to achieve an increase in luminance of the liquid crystal display device.

Preferably, the liquid crystal layer has the helical structure twisted 240 degrees in the direction of the thickness thereof, the retardation ($\Delta nd_{LC}$) of the liquid crystal cell is 700 nm, when the orientation direction a of the orientation film on the other transparent substrate side and the orientation direction b of the orientation film on the one transparent substrate side are viewed from the incident side of light, and the normal direction X between the orientation directions a and b passes at the angle half the interior angle formed by the cross-point O of the orientation directions a and b and the orientation directions a and b, the retardation ($\Delta nd_{RF1}$) of the first phase difference plate adjacent to the other transparent substrate is 170 nm, the angle ($\phi_{RF1}$), which the lagging phase axis β of the first phase difference plate forms with respect to the normal direction X, is 80 degrees counterclockwise when viewed from the incident side of the light, the retardation ($\Delta nd_{RF2}$) of the second phase difference plate adjacent to the first polarizing plate is 425 nm, the angle ($\phi_{RF2}$), which the lagging phase axis γ of the second phase difference plate forms with respect to the normal direction X, is 113 degrees counterclockwise when viewed from the incident side of the light, the retardation ($\Delta nd_{RF3}$) of the third phase difference plate adjacent to the one transparent substrate is 137.5 nm, the angle ($\phi_{RF3}$), which the lagging phase axis δ of the third phase difference plate forms with respect to the normal direction X, is 90 degrees counterclockwise when viewed from the incident side of the light, the angle ($\phi_{pol1}$), which the absorption axis α of the first polarizing plate forms with respect to the normal direction X, is 42 degrees counterclockwise when viewed from the incident side of the light, and the angle ($\phi_{pol2}$), which the absorption axis ε of the second polarizing plate forms with respect to the normal direction X, is 33 degrees counterclockwise when viewed from the incident side of the light.

In a liquid crystal display device with the above characteristics, the white display (light display) is further lightened and, therefore, it becomes possible to achieve an increase in luminance of the liquid crystal display device. In particular, according to the aforementioned liquid crystal display device, the display color of the white display (light display) can be brought closer to white and, therefore, it becomes possible to improve the color purity and the visibility.

Preferably, the liquid crystal layer has the helical structure twisted 240 degrees to 250 degrees in the direction of the thickness thereof, the retardation ($\Delta nd_{LC}$) of the liquid crystal cell is 600 nm to 800 nm, when the orientation direction a of the orientation film on the other transparent substrate side and the orientation direction b of the orientation film on the one transparent substrate side are viewed from the incident side of light, and the normal direction X between the orientation directions a and b and which passes at the angle half the interior angle formed by the cross-point O of the orientation directions a and b and the orientation directions a and b, the retardation ($\Delta nd_{RF1}$) of the first phase difference plate adjacent to the other transparent substrate is 100 nm to 200 nm, the angle ($\phi_{RF1}$), which the lagging phase axis β of the first phase difference plate forms with respect to the normal direction X, is 60 degrees to 100 degrees counterclockwise when viewed from the incident side of the light, the retardation ($\Delta nd_{RF2}$) of the second phase difference plate adjacent to the first polarizing plate is 300 nm to 500 nm, the angle ($\phi_{RF2}$), which the lagging phase axis γ of the second phase difference plate forms with respect to the normal direction X, is 90 degrees to 140 degrees counterclockwise when viewed from the incident side of the light, the retardation ($\Delta nd_{RF3}$) of the third phase difference plate adjacent to the one transparent substrate is 120 nm to 130 nm, the angle ($\phi_{RF3}$), which the lagging phase axis δ of the third phase difference plate forms with respect to the normal direction X, is 48 degrees to 68 degrees counterclockwise when viewed from the incident side of the light, the angle ($\phi_{pol1}$), which an absorption axis α of the first polarizing plate forms with respect to the normal direction X, is 20 degrees to 70 degrees or 110 degrees to 160 degrees counterclockwise when viewed from the incident side of the light, and the angle ($\phi_{pol2}$), which an absorption axis ε of the second polarizing plate forms with respect to the normal direction X, is 3 degrees to 23 degrees counterclockwise when viewed from the incident side of the light.

In a liquid crystal display device with the above characteristics, the white display (light display) is further lightened and, in addition, the black display (dark display) is further darkened, so that it becomes possible to increase the contrast ratio.

Preferably, the liquid crystal layer has the helical structure twisted 240 degrees in the direction of the thickness thereof, the retardation ($\Delta nd_{LC}$) of the liquid crystal cell is 700 nm, when the orientation direction a of the orientation film on the other transparent substrate side and the orientation direction b of the orientation film on the one transparent substrate side are viewed from the incident side of light, and the normal direction X between the orientation directions a and b passes at the angle half the interior angle formed by the cross-point O of the orientation directions a and b and the orientation directions a and b, the retardation ($\Delta nd_{RF1}$) of the first phase difference plate adjacent to the other transparent substrate is 170 nm, the angle ($\phi_{RF1}$), which the lagging phase axis β of the first phase difference plate forms with respect to the normal direction X, is 80 degrees counterclockwise when viewed from the incident side of the light, the retardation ($\Delta nd_{RF2}$) of the second phase difference plate adjacent to the first polarizing plate is 425 nm, the angle ($\phi_{RF2}$), which the lagging phase axis γ of the second phase difference plate forms with respect to the normal direction X, is 113 degrees counterclockwise when viewed from the incident side of the light, the retardation ($\Delta nd_{RF3}$) of the third phase difference plate adjacent to the one transparent substrate is 125 nm, the angle ($\phi_{RF3}$), which the lagging phase axis δ of the third phase difference plate forms with respect to the normal direction X, is 58 degrees counterclockwise when viewed from the incident side of the light, the angle ($\phi_{pol1}$), which the absorption axis α of the first polarizing plate forms with respect to the normal direction X, is 42 degrees counterclockwise when viewed from the incident side of the light, and the angle ($\phi_{pol2}$), which the absorption axis ε of the second polarizing plate forms with respect to the normal direction X, is 13 degrees counterclockwise when viewed from the incident side of the light.

In a liquid crystal display device with the above characteristics, the white display (light display) is further lightened and, in addition, the black display (dark display) is further darkened, so that it becomes possible to further increase the contrast ratio of the liquid crystal display device. In particular, according to the liquid crystal display device, the display color of the white display (light display) can be brought closer to white and, therefore, it becomes possible to improve the color purity and the visibility.

Preferably, the $N_z$ coefficient represented by Formula (1) of the first phase difference plate is −0.5 to 2.0, and the $N_z$ coefficient represented by Formula (1) of the second phase difference plate is −0.5 to 2.0.

$$N_z = (n_x - n_z)/(n_x - n_y) \quad \text{Formula (1)}$$

(In the formula, $n_x$ denotes a refractive index in the X axis direction of the phase difference plate, $n_y$ denotes a refractive index in the Y axis direction of the phase difference plate, and $n_z$ denotes a refractive index in the Z axis direction of the phase difference plate.)

According to such a liquid crystal display device, the range in which contrast is excellent is extended in the vertical and horizontal directions of the display surface. Consequently, the viewing angle is increased in the vertical and horizontal directions of the display surface and, therefore, a liquid crystal display device having superior visual angle characteristic can be achieved.

Preferably, the liquid crystal display device according to the present invention is the liquid crystal display device, wherein the $N_z$ coefficient represented by the Formula (1) of the first phase difference plate is 0.5, and the $N_z$ coefficient represented by the Formula (1) of the second phase difference plate is 0.3.

According to such a liquid crystal display device, the range in which contrast is excellent is further extended in the vertical and horizontal directions of the display surface. Consequently, the viewing angle is further increased in the vertical and horizontal directions of the display surface and, therefore, further superior visual angle characteristic can be achieved.

Preferably, in the liquid crystal display device according to the present invention the plurality of concave surfaces of the metal reflection film are formed continuously and each concave surface comprises a part of a sphere.

According to such a liquid crystal display device, when the plurality of concave surfaces of the metal reflection film are continuous and each concave surface has the shape of a part of a sphere, the reflection efficiency of the light can be improved remarkably compared to that heretofore attained. Consequently, it is possible to thin the metal reflection film in order to improve the translucency of the liquid crystal display device and, therefore, well-lighted display as a transmissive liquid crystal display device can be achieved as well as an improved reflective liquid crystal display device. Thus, both a reflective type and transmissive type well-lighted display can be achieved.

Preferably, in the liquid crystal display device according to the present invention the depths of the plurality of concave portions are 0.1 μm to 3 μm, the distribution of the angles of inclination of the concave portion inner surfaces is −30 degrees to +30 degrees, and the pitches between adjacent concave portions are 5 μm to 50 μm.

According to such a liquid crystal display device, since the surface shape of the base material can be optimized, it is possible to more efficiently reflect the light incident from the outside and, therefore, further well-lighted display can be achieved.

Preferably, in the liquid crystal display device according to the present invention the plurality of concave portions include a first longitudinal section and a second longitudinal section, each passing through the deepest point of the concave portion, the shape of the inner surface of the first longitudinal section is composed of a first curve from a first peripheral portion of the concave portion to the deepest point and a second curve from the deepest point to a second peripheral portion of the concave portion extending from the first curve, and the average value of the absolute values of the angles of inclination of the first curve with respect to the base material surface is larger than the average value of the absolute values of the angles of inclination of the second curve with respect to the base material surface, while the second longitudinal section is orthogonal to the first longitudinal section, and the shape of the inner surface thereof is composed of a shallow type curve and deep type curves existing on both sides of the shallow type curve and having radii of curvature smaller than that of the shallow type curve.

In the present specification, although it is not specifically limited which direction of longitudinal section is assumed to be the first longitudinal section, it is desirable that the longitudinal section in the vertical or fore-and-aft direction when viewed from an observer is assumed to be the first longitudinal section.

According to such a liquid crystal display device, the inner surface shape of the concave portion is formed into a curve which comprises the first curve and the second curve, the boundary therebetween being the deepest point in the first longitudinal section, and in which the average value of the absolute values of the angles of inclination of the first curve with respect to the base material surface is larger than the average value of the absolute values of the angles of inclination of the second curve with respect to the base material surface. That is, the inclination of the first curve is relatively steep, the inclination of the second curve is relatively gentle, and the second curve is longer than the first curve.

Consequently, the quantity of light reflected at the surface in the periphery of the second curve is more than that of light reflected at the surface in the periphery of the first curve. That is, reflection is enabled such that the luminous flux density in the direction of the specular reflection with respect to the surface in the periphery of the second curve is high. Therefore, when the directions of respective first curves of the concave portions are arranged in the specified direction (single or a plurality of specified directions), the reflection intensity in the specified direction can be increased as the total reflector.

Furthermore, since each inner surface shape of these concave portions in the second longitudinal section orthogonal to the first longitudinal section is formed to include the shallow type curve and the deep type curves existing on both sides of the shallow type curve and having small radii of curvature, the reflectance nearly in the direction of the specular reflection can be increased. It is desirable that the deep type curves exist evenly on both sides of the shallow type curve.

Consequently, regarding the total reflection characteristics in the first longitudinal section, the reflectance has a peak at an angle of the specular reflection and, in addition, the reflectance toward the direction of reflection by the surface in the periphery of the second curve is increased. That is, it is possible to achieve a reflection characteristic which can condense the reflected light moderately in the specified direction while the reflected light in the direction of the specular reflection is ensured adequately.

Preferably, in the liquid crystal display device according to the present invention the plurality of concave portions are formed such that each of the first longitudinal sections and the second longitudinal sections is in the same direction, and each of the first curves is orientated unidirectionally, and the reflector is placed such that the first curves in respective concave portions locate above the second curves when viewed from the observer.

That is, the first curves of respective concave portions are orientated unidirectionally and, in addition, the second curves of respective concave portions are also orientated unidirectionally.

According to such a liquid crystal display device, the reflectance in the direction of reflection caused by the surface in the periphery of the second curve is increased. That is, it is possible to moderately condense the reflected light toward the specified direction.

When all the first curves in concave portions are located above the second curves when viewed from the observer, in general, external light, etc., primarily incident from above is shifted toward the direction of the normal to the base material surface rather than the direction toward the feet of the observer.

Since the external light, etc. primarily incident from above when viewed from the observer efficiently enters into the surface in the periphery of the second curve, the quantity of the reflected light is increased as a whole.

Furthermore, the quantity of light in the direction of the specular reflection can be ensured adequately by the reflection from the shallow curve in the second longitudinal section.

Consequently, the quantity of light reflected in the direction of the line of sight of the observer is increased and, therefore, a reflective liquid crystal display device with a well-lighted display at the practical point of view is realized.

Preferably, in the liquid crystal display device according to the present invention the angles of inclination of the first curve and the second curve become zero with respect to the base material surface at the position where they are in contact with each other.

According to such a liquid crystal display device, since the whole concave portion inner surface can be formed gently, it is possible to avoid reduction of the quantity of reflection in the direction of the specular reflection.

Preferably, in the liquid crystal display device according to the present invention the depths of the plurality of concave portions are 0.1 $\mu$m to 3 $\mu$m and are formed randomly.

When the depth of concave portion is less than 0.1 $\mu$m, scattering effect of light is inadequate. When exceeding 3 $\mu$m, the thickness of the base material for realizing this depth becomes excessively large leading to problems during manufacture as well as a product that is excessively thick, weighty, and generally inconvenient. When the depths of the plurality of concave portions are formed on a random basis, occurrence of the moirépattern due to interference of light (which is likely to occur when the depths of the concave portions are formed regularly) is prevented, peak-like condensation of the quantity of reflected light at a specified visual angle is alleviated and, therefore, change of the quantity of reflected light in the visual angle becomes gentle.

Preferably, in the liquid crystal display device according to the present invention the plurality of concave portions are disposed randomly and adjacent to each other.

When the interval between concave portions is large, since a flat surface is disposed between the concave portions, plane reflection is increased, and adequate diffuse reflection cannot be achieved in a limited pixel region. Consequently, the concave portions are preferably formed adjacently to each other. Since the moirépattern occurs when the concave portions are arranged regularly, the concave portions are preferably arranged randomly.

Preferably, in the liquid crystal display device according to the present invention the reflectance reaches a peak at the angle of the specular reflection with respect to the metal reflection film surface, the integral of reflectance within the range of the reflection angle smaller than the angle of the specular reflection and the integral of reflectance within the range of the reflection angle larger than the angle of the specular reflection are different, and the range of the reflection angle of the total reflector in which the integral of reflectance is large is above the angle of the specular reflection with respect to the metal reflection film surface when viewed by the observer.

According to such a liquid crystal display device, and according to the present invention, when the usual viewing angle of the observer deviates from the direction of the specular reflection, a reflector is formed that reflects light primarily in the direction of the usual viewing angle while the reflected light in the direction of the specular reflection is ensured.

In general, external light, etc., primarily incident from above can be shifted toward the direction of the normal to the base material surface rather than the direction toward the feet of the observer.

Consequently, for example, when used as a display device of a cellular phone and a notebook computer, the quantity of light reflected in the direction of the line of sight of the observer is increased and, therefore, a reflective liquid crystal display device with a well-lighted display at the practical point of view is realized.

In the liquid crystal display device according to the present invention, a color filter may be placed between the one transparent substrate constituting the liquid crystal cell and the transparent electrode placed on the inner surface side thereof.

DESCRIPTION OF THE PREFERRED EMBODIMENTS

The embodiments according to the present invention will be described below with reference to the drawings.

Figure 1:
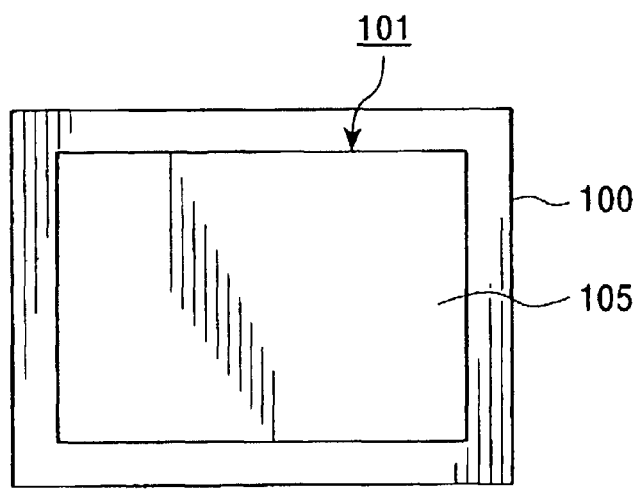
FIG. 1 is a front view showing the display portion of a portable data terminal provided with a liquid crystal display device according to an embodiment of the present invention.

FIG. 1 is a front view showing an embodiment of the display portion of a portable data terminal provided with a semitransparent reflective liquid crystal display device according to an embodiment in which a liquid crystal display device of the present invention is applied to an STN type semitransparent reflective liquid crystal display device.

The display portion of the portable data terminal according to the present invention is provided with at least a frame member 100 and a semitransparent reflective liquid crystal display device 101 having a display surface 105 according to the present embodiment stored in the frame member 100. The semitransparent reflective liquid crystal display device 101 according to this embodiment is of horizontal type.

Figure 2:
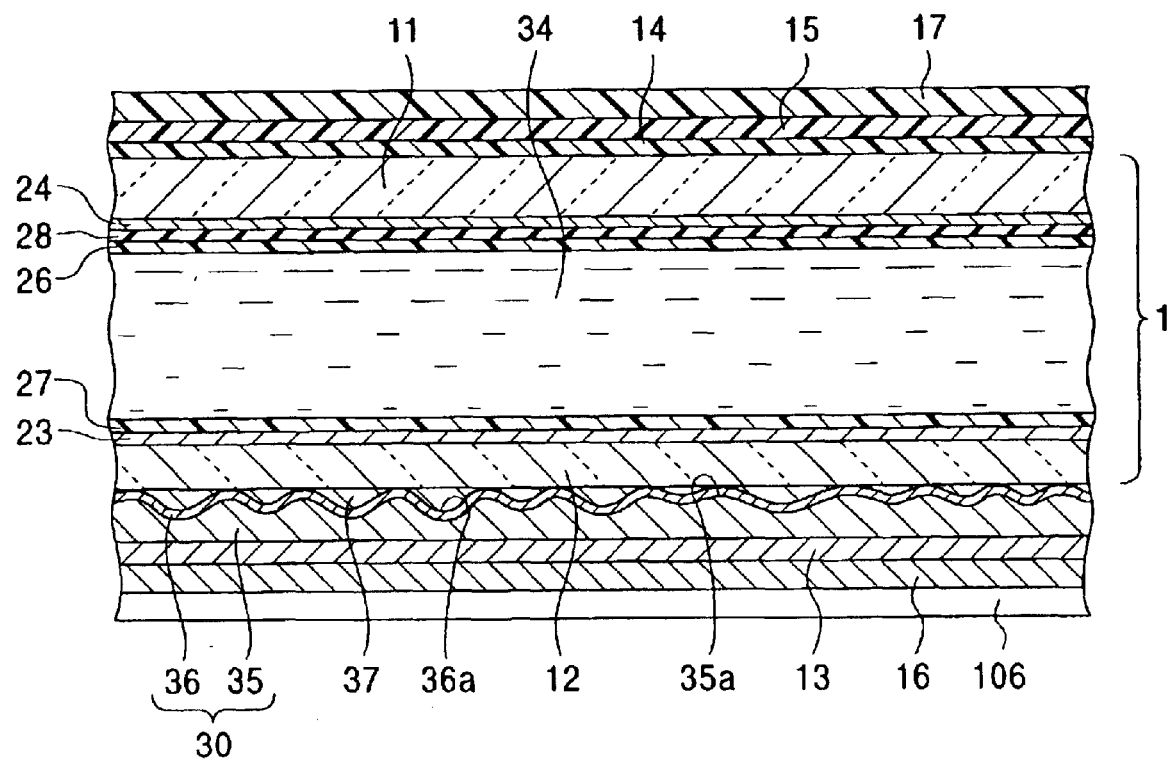
FIG. 2 is a sectional view showing the mode in which a liquid crystal display device according to an embodiment of the present invention is applied to an STN type semitransparent reflective liquid crystal display device.

As shown in FIG. 2, the semitransparent reflective liquid crystal display device 101 according to the present embodiment is configured roughly by placing a liquid crystal cell 1, placing a first phase difference plate (phase difference plate adjacent to the other transparent substrate) 14, a second phase difference plate (phase difference plate adjacent to a polarizing plate) 15, and a first polarizing plate 17 on the outer surface side of an upper glass substrate (the other transparent substrate) 11 of the liquid crystal cell 1 in that order from the upper glass substrate 11 side, placing a reflector 30 on the outer surface side of the lower glass substrate (the one transparent substrate) 12 of the liquid crystal cell 1, and further placing a third phase difference plate 13 and a second polarizing plate 16 on the outer surface side of the reflector 30. A backlight 106 is attached on the underside of the second polarizing plate 16.

The liquid crystal cell 1 is configured roughly by placing a common electrode (transparent electrode) 23 and a lower orientation film (orientation film on the one transparent substrate side) 27 on the inner surface side of the lower glass substrate 12 of the upper and lower glass substrates 11 and 12 facing each other with a liquid crystal layer 34 therebetween in that order from the lower glass substrate 12 side, and placing a segment electrode (transparent substrate) 24, a topcoat 28, and an upper orientation film, (orientation film on the other transparent substrate side) 26 on the inner surface side of the upper glass substrate 11 in that order from the upper glass substrate 11 side.

The semitransparent reflective liquid crystal display device 101 having the configuration is operated in the reflective mode without the backlight 106 being lighting up when adequate external light is available, and is operated in the transmissive mode with lighting up of the backlight 106 under circumstances where the external light cannot be available.

In the reflective mode, the light incident upon the first polarizing plate 17 is linearly polarized by this polarizing plate 17, and the polarized light is elliptically polarized by passing through the first and second phase difference plates 14 and 15 and the liquid crystal layer 34. This elliptically polarized light is reflected at the reflection plate 30, is passed again through the liquid crystal layer 34 and the first and second phase difference plates 14 and 15, is linearly polarized again by the first polarizing plate 17, and is emitted.

In the transmissive mode, the light emitted from the backlight 106 is linearly polarized by the second polarizing plate 16, the polarized light is elliptically polarized by passing through the third phase difference plate 13, the liquid crystal layer 34, and the first and second phase difference plates 14 and 15. This elliptically polarized light is linearly polarized by passing through the first polarizing plate 17, and is emitted from the first polarizing plate 17. The reflector 30 interposed between the third phase difference plate 13 and the liquid crystal layer 34 is provided with a metal reflection film 36 having a thickness of 5 to 50 mm, as described later, and transmits a portion of the light emitted from the backlight 106. Metal (such as Al, Au, Ag, Cu) is not the only material from which the reflection film may be fabricated; any material may be used that has similar reflectance/transmittance characteristics as metal with the above thickness for light within the desired wavelength range (usually visible 400 nm–800 nm).

Note that in the present specification, the numerical values presented, unless otherwise specified as exactly those values, are approximate, e.g. "15 nm" is "about 5 nm" unless specified as "exactly 5 nm". Similarly, each range is indicated as "x to y." Such a range represents "about x or more, but about y or less" unless otherwise designated as exactly using the particular values. For example, the above 5 to 50 nm range is about 5 nm or more, but about 50 nm or less. Additionally, from time to time "on the order of" or "about" may also be used as prefixes to values or ranges, but are merely present to remind the reader that these numbers are approximate as long as the desired characteristics are obtained.

Consequently, the semitransparent reflective liquid crystal display device 101 according to the present embodiment is configured such that the light passes through the third phase difference plate 13 and the second polarizing plate 16 only in the case of the transmissive mode.

Transparent orientation films, which are used commonly and which are macromolecular films, for example, polyimide, having been subjected to a rubbing treatment, are used as the upper and lower orientation films 26 and 27.

In this embodiment, the orientation direction (rubbing direction) a of the upper orientation film 26 is on the order of −35 degrees to −25 degrees, and preferably, is −30 degrees (+330 degrees), wherein as shown in FIG. 3 to FIG. 6, the counterclockwise direction is indicated by +, and the clockwise direction is indicated by − when viewed from the light incident side.

In this embodiment, the orientation direction (rubbing direction) b of the lower orientation film 27 is on the order of +25 degrees to +35 degrees, and preferably, is at +30 degrees, wherein as shown in FIG. 3 to FIG. 6, the counterclockwise direction is indicated by +, and the clockwise direction is indicated by − when viewed from the light incident side.

Figure 4:
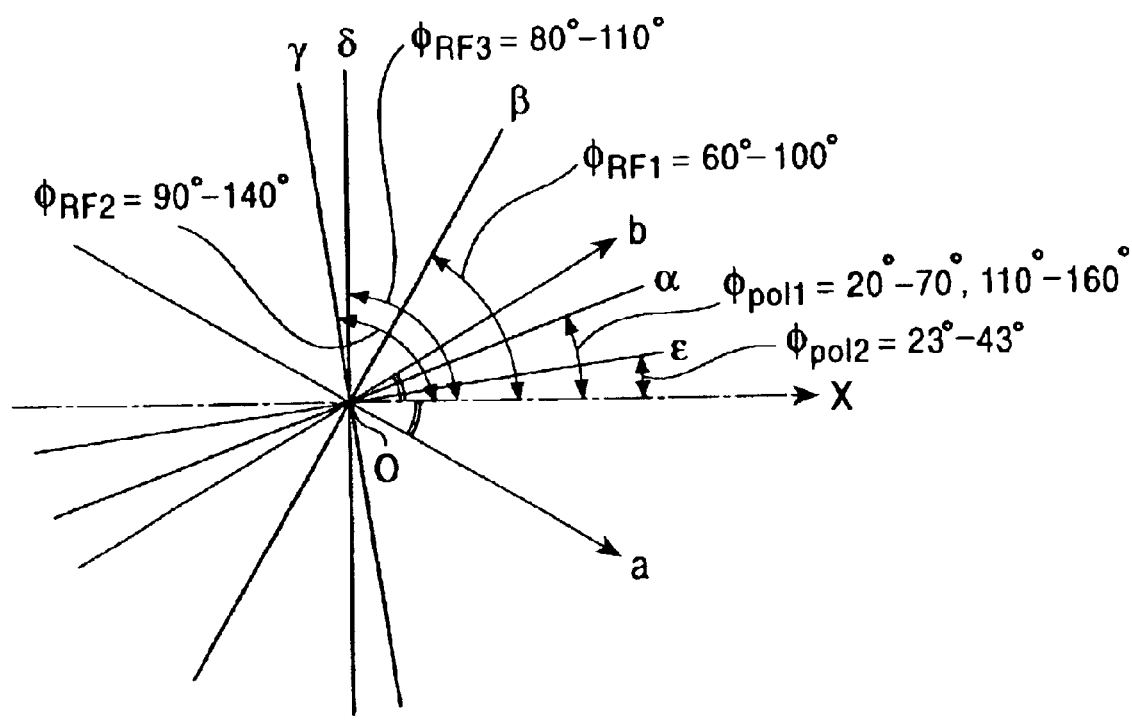
FIG. 4 is a diagram showing the arrangement relationship among an absorption axis $\alpha$ of a first polarizing plate, a lagging phase axis $\beta$ of a first phase difference plate, a lagging phase axis $\gamma$ of a second phase difference plate, a lagging phase axis $\gamma$ of a second phase difference plate, the orientation direction a of an upper orientation film, the orientation direction b of a lower orientation film, a lagging phase axis $\delta$ of a second phase difference plate, and an absorption axis $\epsilon$ of a second polarizing plate of a semitransparent reflective liquid crystal display device according to an embodiment of the present invention, and is a plan view showing the optimum condition for increasing luminance.
Figure 5:
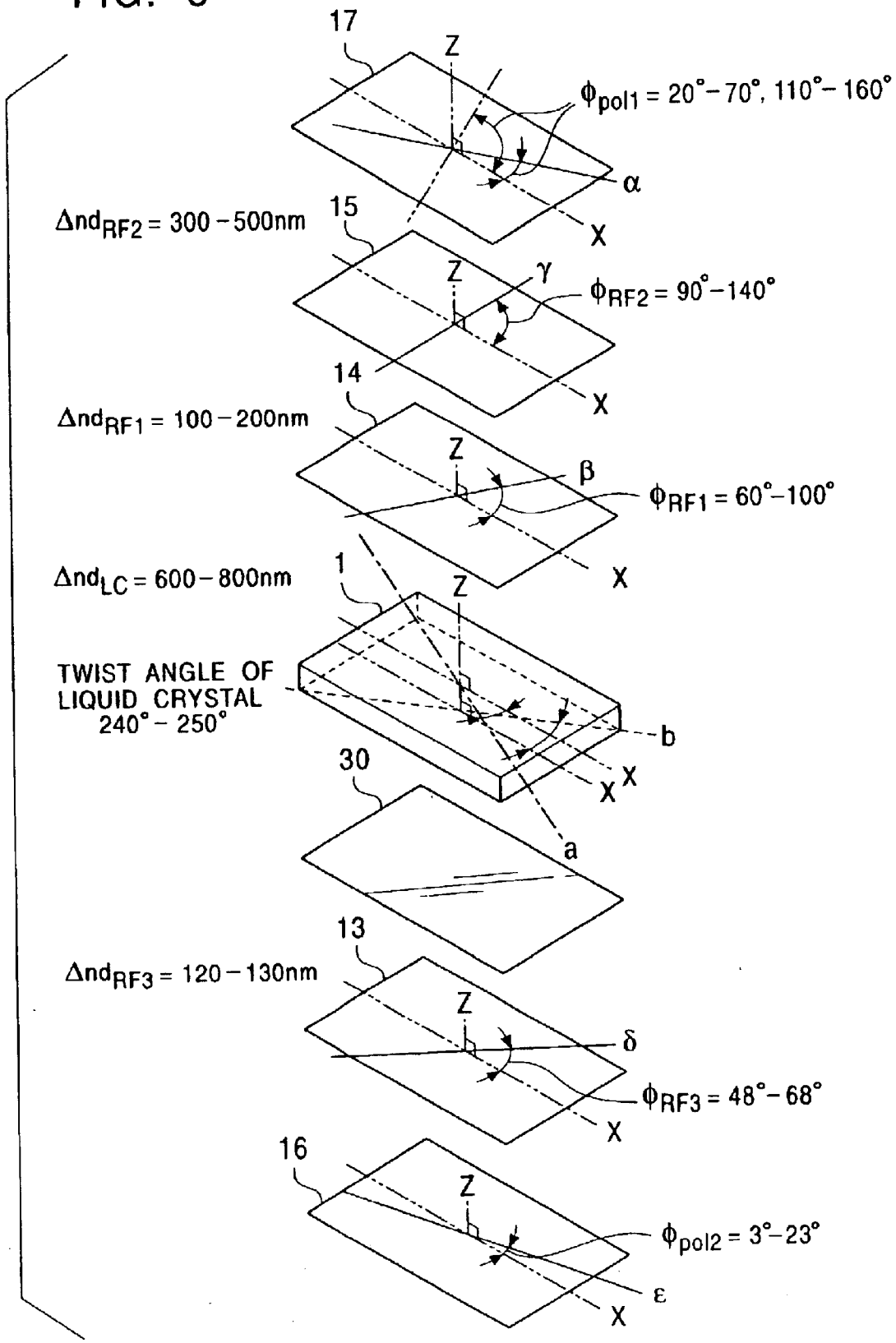
FIG. 5 is a diagram showing a key portion of a semitransparent reflective liquid crystal display device according to an embodiment of the present invention, and is a perspective exploded view showing the optimum condition for increasing contrast ratio.
Figure 6:
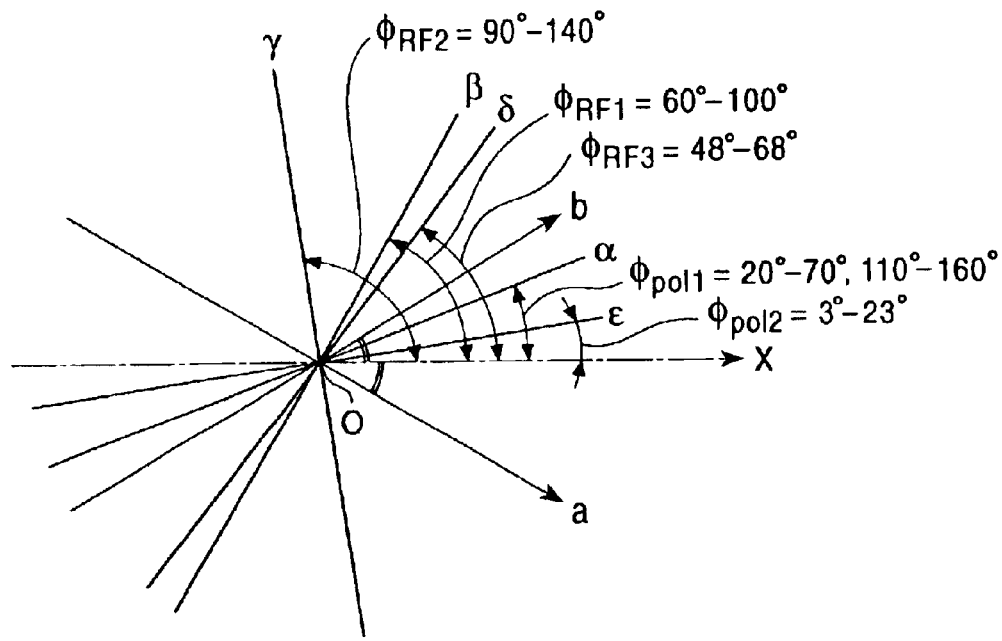
FIG. 6 is a diagram showing the arrangement relationship among an absorption axis $\alpha$ of a first polarizing plate, a lagging phase axis $\beta$ of a first phase difference plate, a lagging phase axis $\gamma$ of a second phase difference plate, the orientation direction a of an upper orientation film, the orientation direction b of a lower orientation film, a lagging phase axis $\delta$ of a second phase difference plate, and an absorption axis $\epsilon$ of a second polarizing plate of a semitransparent reflective liquid crystal display device according to an embodiment of the present invention, and is a plan view showing the optimum condition for increasing contrast ratio.

Herein, when the orientation direction a of the upper orientation film 26 and the orientation direction b of the lower orientation film 27 are viewed from the incident side of the light as shown in FIG. 4 to FIG. 6, the direction, which is a direction between the orientation directions a and b and which passes at an angle half the interior angle formed by the cross-point O of the orientation directions a and b and the orientation directions a and b, is referred to as the normal direction X.

Figure 3:
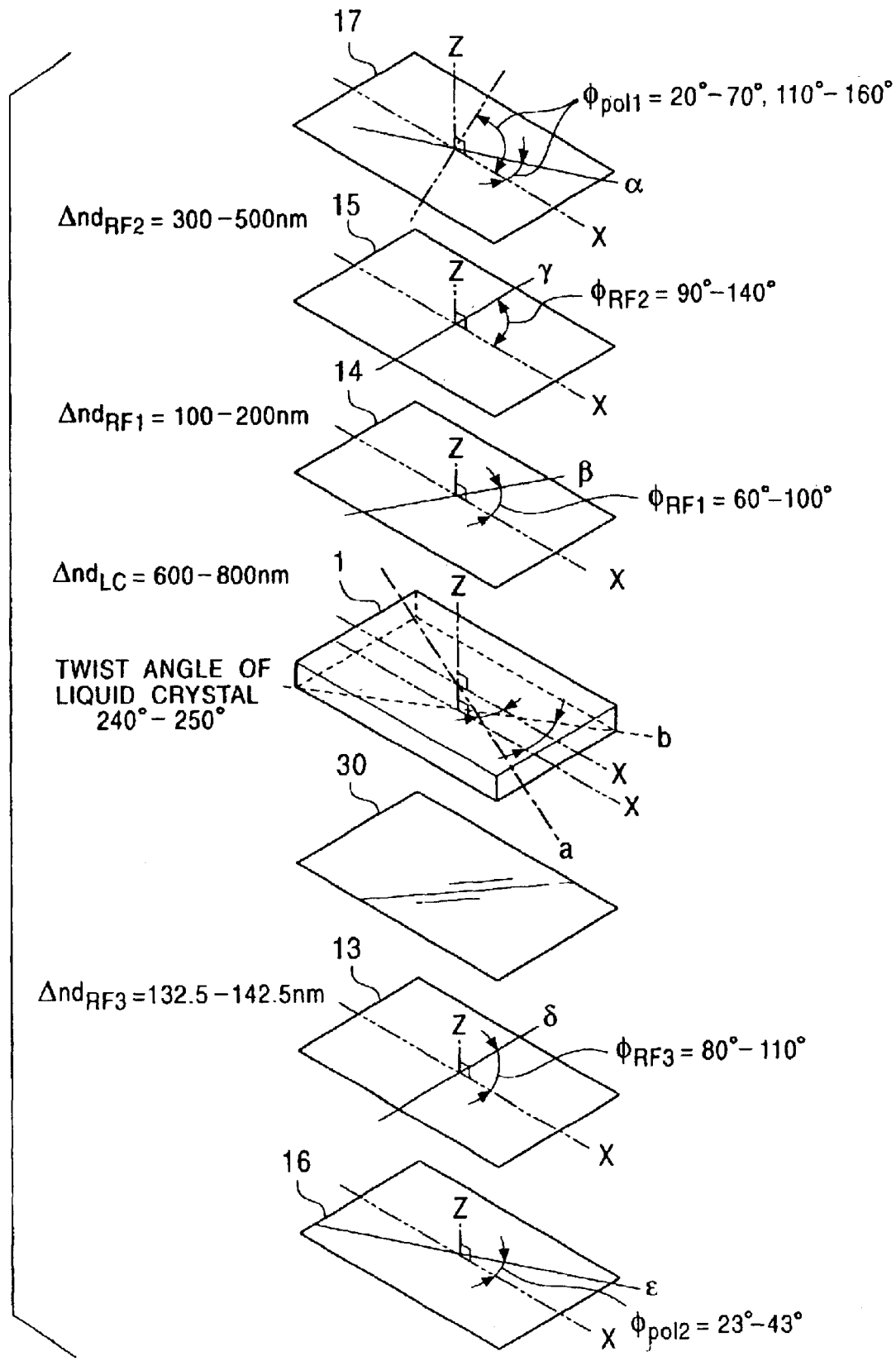
FIG. 3 is a diagram showing a key portion of a semitransparent reflective liquid crystal display device according to an embodiment of the present invention, and is a perspective exploded view showing the optimum condition for increasing luminance.

In FIG. 3 and FIG. 5, reference numeral Z denotes the directions orthogonal to the respective surfaces on the incident side of the light of the liquid crystal cell 1, the first, second, and third phase difference plates 14, 15, and 13, and the first and second polarizing plate 17 and 16.

The liquid crystal layer 34 has preferably a helical structure twisted 240 degrees to 250 degrees in the direction of the thickness thereof, more preferably, has a helical structure twisted 240 degrees (the twist angle of the liquid crystal molecule constituting the liquid crystal layer 34 is 240 degrees to 250 degrees), and is made of a liquid crystal molecule which is encapsulated in the region surrounded by the upper and lower orientation films 26 and 27 placed on the internal side of the upper and lower glass substrates 11 and 12 and a seal member (not shown in the drawing) joining these orientation films 26 and 27 while a predetermined interval is ensured and which is in a nematic state at ambient temperature. As this liquid crystal molecule, the one of super twisted nematic (STN) type is used.

Preferably, a liquid crystal, in which the wavelength dispersion characteristic of the double refractive index ($\Delta n_{LC}$) of the liquid crystal is smaller than the wavelength dispersion characteristic of the double refractive index ($\Delta n_{RF1}$) of the first phase difference plate 14, the wavelength dispersion characteristic of the double refractive index ($\Delta n_{RF2}$) of the second phase difference plate 15, and the wavelength dispersion characteristic of the double refractive index ($\Delta n_{RF3}$) of the third phase difference plate 13, is used as the liquid crystal constituting this liquid crystal layer 34 from the viewpoint of achieving high contrast and achieving superior display characteristics. The wavelength dispersion characteristic of the ($\Delta n_{LC}$) of the liquid crystal constituting the liquid crystal layer 34 can be changed by changing the liquid crystal material itself. The wavelength dispersion characteristics of $\Delta n_{RF1}$, $\Delta n_{RF2}$, and $\Delta n_{RF3}$ of the first, second, and third phase difference plates 14, 15, and 13 can be changed by changing the material of each phase difference plate.

The topcoat 28 is placed for ensuring insulation between the segment electrode 24 and the upper orientation layer 26, and is made of an inorganic material, for example, silica and $ZrO_2$.

In the present embodiment, the upper glass substrate 11 is made of soda lime glass, etc. The thickness of this upper glass substrate 11 is preferably specified to be 0.3 mm to 1.1 mm, although both the material and thickness may vary depending on the type of the liquid crystal display device used.

In the present embodiment, soda lime glass containing an oxide of alkali metal, for example, sodium, or the like is used as the lower glass substrate (the one transparent substrate) 12 although, once again, the material and thickness may vary depending on the type of the liquid crystal display device. The thickness of this lower glass substrate 12 is preferably specified to be 0.3 mm to 1.1 mm.

Figure 7:
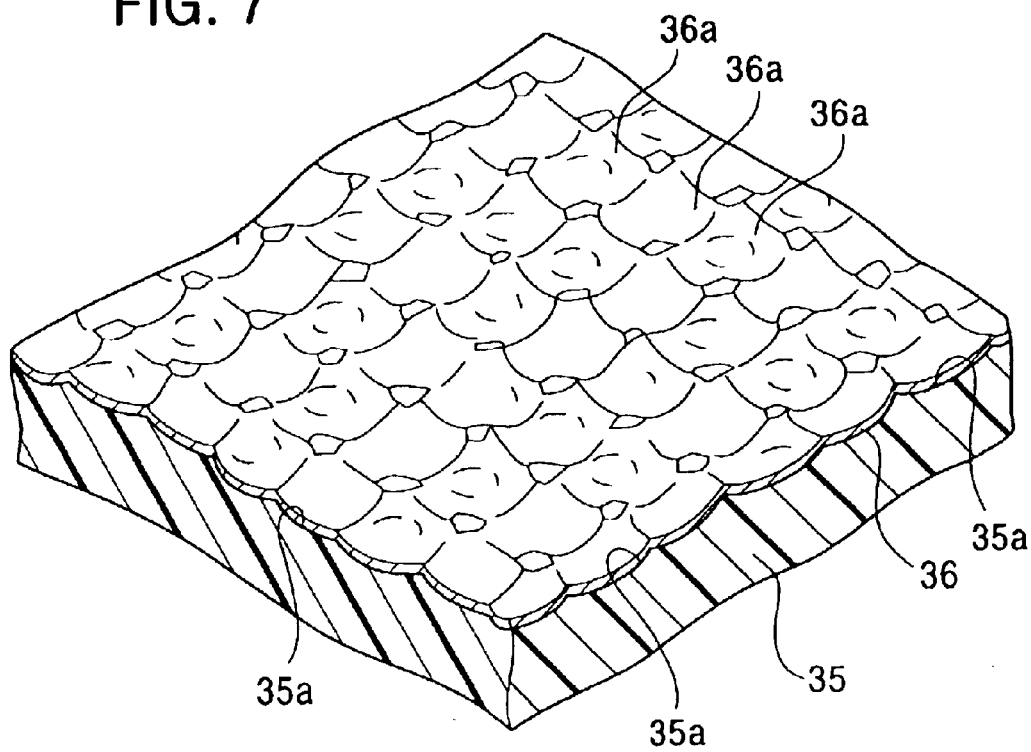
FIG. 7 is a perspective view showing an example of a reflector provided in the semitransparent reflective liquid crystal display device shown in FIG. 2.

As shown in FIG. 2 and FIG. 7, the reflector 30 is configured by forming the metal reflection film 36 on the base material 35 with a plurality of concave portions 35a formed on the surface while the metal reflection film 36 has a plurality of concave surfaces 36a corresponding to the respective concave portions 35a. The metal reflection film 30 is adhered to the lower substrate 12 of the liquid crystal cell 1 with a transparent adhesive layer 37 made of an epoxy-based material containing fluorine such that the metal reflection film 36 faces the lower glass substrate 12 side.

The base material 35 is formed to impart a concave and convex shape to the metal reflection film 36 formed thereon. The concave/convex shape of the metal reflection film 36 permits efficient reflection of the incident light and scattering of the reflected light, thereby allowing a well-lighted display to be realized in the reflective mode.

FIG. 7 is a perspective view showing the base material 35 and a portion including the metal reflection film 36 formed thereon. As shown in this drawing, large numbers of concave surfaces 36a, each having an inner surface constituting a part of a sphere, are formed continuously on the surface of the metal reflection film 36 while horizontally overlapping each other. The shapes of the concave surfaces 36a correspond to the shapes of the concave portions 35a of the base material.

Desirably, the depths of the concave portions 35a are randomly formed within the range of 0.1 $\mu$m to 3 $\mu$m, the pitches between adjacent concave portions 35a are arranged randomly within the range of 5 $\mu$m to 50 $\mu$m, and the angles of inclination of the concave portion 35a inner surfaces are −30 degrees to +30 degrees.

In particular, it is important that the distribution of the angles of inclination of the concave portion 35a inner surfaces is −30 degrees to +30 degrees, and the pitches between adjacent concave portions 35a are arranged randomly with respect to all directions in the plane. This is because if the pitches between adjacent concave portions 35a are regular, a color caused by interference appears and, therefore, the reflected light is colored. Furthermore, when the distribution of the angles of inclination of the concave portion 35a inner surfaces exceeds the range of −30 degrees to +30 degrees, the diffusion angle of the reflected light is excessive. With an excessive diffusion angle, the reflection intensity is reduced and well-lighted display cannot be achieved (this is because the diffusion angle of the reflected light becomes 36 degrees or more in air and, therefore, the reflection intensity peak inside the liquid crystal display device is reduced and the total reflection loss is increased).

When the depths of the concave portions 35a exceed 3 $\mu$m, the crests of the convex portions cannot be completely buried by the adhesive layer 37 during the later step of flattening the concave portions 35a, resulting in the inability to even out the layer to the desired flatness and unevenness in display.

When the pitches between adjacent concave portions 35a are less than 5 μm, there are constraints regarding manufacture of a transfer mold used for forming the base material. In this case, multiple problems occur: the processing time is increased by a large degree, a shape that achieves the desired reflection characteristics cannot be formed, and interference light is generated, to name a few. When a diamond indenter 30 μm to 100 μm in diameter is used to manufacture the transfer mold, the pitches between adjacent concave portions 35a are able to be specified to be 5 μm to 50 μm, the desired range.

The manufacturing method for forming this base material 35 is not specifically limited, and manufacture can be performed, for example, as described below.

A coating of a photosensitive resin solution, for example, an acryl-based resist, is applied on the third phase difference plate 13 to form a photosensitive resin layer, a transfer mold provided with a concave and convex surface having the shape of concavities and convexities is pressed against this photosensitive resin layer and, therefore, the shape of the concave and convex surface of the transfer mold is transferred to the photosensitive resin layer.

This transfer mold can be manufactured such that a diamond indenter is pressed against the surface of a flat plate-shaped matrix base material which is made of brass, stainless steel, tool steel, or the like and which has a flat surface so as to form a predetermined surface shape and to manufacture a matrix for transfer mold and, thereafter, the shape is molded in a material, for example, silicone resin, using this matrix for transfer mold. This transfer mold is in the shape of concavities and convexities which is the reverse of the surface shape of the plurality of concave portions 35a shown in FIG. 7.

Subsequently, a light beam, for example, an ultraviolet ray (g, h, and i rays), radiates from the back surface side of the side, on which the photosensitive resin layer has been formed, of the third phase difference plate 13 to cure the photosensitive resin layer and, furthermore, the photosensitive resin layer is baked by a heating device, for example, a furnace and a hot plate. Consequently, the base material 35 made of the photosensitive resin layer including the plurality of concave portions 35a on the surface is formed.

The metal reflection film 36 is placed to reflect and scatter the light incident upon the liquid crystal layer 30 and, therefore, to achieve well-lighted display, and is formed on the base material 35. Preferably, a metal material, for example, Al and Ag, having a high reflectance is used as this metal reflection film 36, and these metal materials can be formed by a film making method, for example, sputtering and vacuum evaporation.

The film thickness of the metal reflection film 36 is preferably within the range of 5 to 50 nm. This is because when the film thickness is smaller than 5 nm, since the reflectance of light by the metal reflection film 36 is excessively small, display in the reflective mode becomes dark, and when the thickness is larger than 50 nm, the translucency of the metal reflection film 36 is reduced and, therefore, display in the transmissive mode becomes dark.

The film thickness of the metal reflection film 36 is more preferably within the range of 8 to 20 nm. When the film thickness of the metal reflection film 36 is specified to be within such a range, since display in the transmissive mode can be well-lighted, difference in brightness of the display between in the transmissive mode and the reflective mode can be reduced. Consequently, easiness on the eyes of the display can be improved in the use while the two operation modes are switched.

The film thickness of the metal reflection film 36 is most preferably within the range of 8 to 10 nm (that is, 9 nm±1 nm). When the film thickness is set within such a range, the brightness in the reflective mode can be maintained and, in addition, remarkably superior brightness can be realized in the transmissive mode.

The value of retardation ($\Delta nd_{LC}$) that is the product of the double refractive index ($\Delta n_{LC}$) of the liquid crystal cell 1 and the thickness d of the liquid crystal cell 1 is 600 nm to 800 nm (measurement wavelength 589 nm). When the $\Delta nd_{LC}$ is outside the aforementioned range, the white display is darkened and the contrast is reduced.

It is relatively preferable that the aforementioned $\Delta nd_{LC}$ is preferably 690 nm to 705 nm, and more preferably, is 700 nm as excellent black-and-white display having high contrast can be achieved.

As described above, the semitransparent reflective liquid crystal display device 101 according to the present embodiment is configured such that the light passes through the third phase difference plate 13 and the second polarizing plate 16 only in the case of the transmissive mode. Consequently, the first and second phase difference plates 14 and 15 and the first polarizing plate 17 are involved in the operation of the liquid crystal display device in both the transmissive mode and reflective mode while the third phase difference plate 13 and second polarizing plate 16 are involved only in the transmissive mode.

The first, second, and third phase difference plate 14, 15, and 13 are made of a monoaxially or biaxially oriented film of, for example, polyvinyl alcohol and polycarbonate, and the direction of the orientation becomes a lagging phase axis.

The $\Delta nd_{RF1}$ of the first phase difference plate 14 is 100 nm to 200 nm (measurement wavelength 589 nm). When the $\Delta nd_{RF1}$ is outside the aforementioned range, a high contrast ratio or high luminance cannot be achieved in the transmissive mode and the reflective mode. It is especially preferable that the $\Delta nd_{RF1}$ is 170 nm to achieve these dual results.

As shown in FIG. 3 to FIG. 6, an angle ($\phi_{RF1}$), which a lagging phase axis β of the first phase difference plate 14 forms with respect to the normal direction X, is 60 degrees to 100 degrees counterclockwise when viewed from the incident side of the light. When the lagging phase axis β is not set within this range, high contrast ratio or high luminance cannot be achieved in the transmissive mode and the reflective mode.

It is preferable that the angle ($\phi_{RF1}$), which the lagging phase axis β forms with respect to the normal direction X, is 80 degrees counterclockwise when viewed from the incident side of the light from the viewpoint that a high contrast ratio or high luminance can be achieved in the transmissive mode and the reflective mode.

The $\Delta nd_{RF2}$ of the second phase difference plate 15 is 300 nm to 500 nm (measurement wavelength 589 nm). When the $\Delta nd_{RF2}$ is outside this range, a high contrast ratio or high luminance cannot be achieved in the transmissive mode and the reflective mode. It is especially preferable that the $\Delta nd_{RF2}$ is 425 nm to realize these dual results.

As shown in FIG. 3 to FIG. 6, an angle ($\phi_{RF2}$), which a lagging phase axis γ of the second phase difference plate 15 forms with respect to the normal direction X, is 90 degrees to 140 degrees counterclockwise when viewed from the incident side of the light. When the lagging phase axis γ is not set within this range, a high contrast ratio or high luminance cannot be achieved in the transmissive mode and the reflective mode. It is preferable that the angle ($\phi_{RF2}$), which the lagging phase axis γ forms with respect to the normal direction X, is 113 degrees counterclockwise when viewed from the incident side of the light so that a high contrast ratio or high luminance can be achieved in the transmissive mode and the reflective mode.

Regarding the third phase difference plate 13 and second polarizing plate 16, since the optimum ranges of the $\Delta nd_{RF3}$ and the lagging phase axis δ of the third phase difference plate 13 and the optimum range of the absorption axis ε of the second polarizing plate 16 are different between the case where a liquid crystal display device having well-lighted white display and superior luminance in the transmissive mode is configured and the case where a liquid crystal display device exhibiting excellent black-and-white display and high contrast ratio in the transmissive mode is configured, each case will be described separately.

In the case where the liquid crystal display device having well-lighted white display and superior luminance is configured, as shown in FIG. 3 and FIG. 4, it is preferable that the $\Delta nd_{RF3}$ of the third phase difference plate 13 is 132.5 nm to 142.5 nm (measurement wavelength 589 nm). When the $\Delta nd_{RF3}$ is outside this range, a well-lighted white display with high luminance cannot be achieved in the transmissive mode. In particular, it is more preferable that the $\Delta nd_{RF3}$ is 137.5 nm.

As shown in FIG. 3 and FIG. 4, an angle ($\phi_{RF3}$), which a lagging phase axis δ of the third phase difference plate 13 forms with respect to the normal direction X, is preferably 80 degrees to 100 degrees counterclockwise when viewed from the incident side of the light. When the lagging phase axis δ is not set within this range, a well-lighted white display with high luminance cannot be achieved in the transmissive mode. It is preferable that the angle ($\phi_{RF3}$), which the lagging phase axis δ forms with respect to the normal direction X, is set at 90 degrees counterclockwise when viewed from the incident side of the light, thereby permitting an excellent white display to be achieved.

Furthermore, as shown in FIG. 3 and FIG. 4, an angle ($\phi_{pol2}$), which an absorption axis ε of the second polarizing plate 16 forms with respect to the normal direction X, is preferably 23 degrees to 43 degrees counterclockwise when viewed from the incident side of the light.

When the absorption axis ε of the second polarizing plate 16 is not set within this range, an excellent white display with high luminance cannot be achieved in the transmissive mode. It is preferable that the angle ($\phi_{pol2}$), which the absorption axis ε forms with respect to the normal direction X, is set at 33 degrees counterclockwise when viewed from the incident side of the light to permit an excellent white display with high luminance to be achieved.

In the case where the liquid crystal display device exhibiting high contrast ratio is configured, as shown in FIG. 5 and FIG. 6, it is preferable that the $\Delta nd_{RF3}$ of the third phase difference plate 13 is 120 nm to 130 nm (measurement wavelength 589 nm). When the $\Delta nd_{RF3}$ is outside this range, an excellent black-and-white display with high contrast ratio cannot be achieved in the transmissive mode. In particular, it is more preferable that the $\Delta nd_{RF3}$ is 125 nm.

As shown in FIG. 5 and FIG. 6, the angle ($\phi_{RF3}$), which the lagging phase axis δ of the third phase difference plate 13 forms with respect to the normal direction X, is prefer- ably 48 degrees to 68 degrees counterclockwise when viewed from the incident side of the light. When the lagging phase axis δ is not set within this range, an excellent black-and-white display with high contrast ratio cannot be achieved in the transmissive mode. It is preferable that the angle ($\phi_{RF3}$), which the lagging phase axis δ forms with respect to the normal direction X, is 58 degrees counterclockwise when viewed from the incident side of the light to permit an excellent black-and-white display with a high contrast ratio to be achieved.

Furthermore, as shown in FIG. 5 and FIG. 6, the angle ($\phi_{pol2}$), which the absorption axis ε of the second polarizing plate 16 forms with respect to the normal direction X, is preferably 3 degrees to 23 degrees counterclockwise when viewed from the incident side of the light.

When the absorption axis ε of the second polarizing plate 16 is not set within this range, an excellent black-and-white display with a high contrast ratio cannot be achieved in the transmissive mode. It is preferable that the angle ($\phi_{pol2}$), which the absorption axis ε forms with respect to the normal direction X, is 13 degrees counterclockwise when viewed from the incident side of the light to permit an excellent black-and-white display with a high contrast ratio to be achieved.

It is preferable that the $N_z$ coefficient represented by the Formula (1) of the first phase difference plate 14 is −0.5 to 2.0, and the $N_z$ coefficient represented by the Formula (1) of the second phase difference plate 15 is −0.5 to 2.0 as, within this range, the contrast is excellent, is extended in the vertical and horizontal directions of the display surface 105 shown in FIG. 1 and, therefore, a liquid crystal display having a wide viewing angle in the vertical and horizontal directions of the display surface 105 and superior visual angle characteristic can be achieved.

It is more preferable that the $N_z$ coefficient represented by the Formula (1) of the first phase difference plate 14 is 0.5, and the $N_z$ coefficient represented by the Formula (1) of the second phase difference plate 15 is 0.3 as within this range, the contrast is excellent, is further extended in the vertical and horizontal directions of the display surface and, therefore, the viewing angle is further increased in the vertical and horizontal directions of the display surface, and further superior visual angle characteristic can be achieved.

Furthermore, as shown in FIG. 3 to FIG. 6, an angle ($\phi_{pol1}$), which an absorption axis α of the first polarizing plate 17 forms with respect to the normal direction X, is preferably 20 degrees to 70 degrees or 110 degrees to 160 degrees counterclockwise when viewed from the incident side of the light.

When the absorption axis α of the first polarizing plate 17 is substantially outside of this range, a high contrast ratio or high luminance cannot be achieved in the transmissive mode and in the reflective mode. It is more preferable that the angle ($\phi_{pol1}$), which the absorption axis α forms with respect to the normal direction X, is 42 degrees counterclockwise when viewed from the incident side of the light to permit a high contrast ratio or high luminance to be achieved.

In the semitransparent reflective liquid crystal display device 101 according to the present embodiment, since the second polarizing plate 16 is placed on the external side of the metal reflection film 36 having a thickness of 5 to 50 nm, in the reflective mode, the incident light is reflected by the metal reflection film 36 and does not pass through the second polarizing plate 16 and, therefore, spectral characteristics are not degraded, the color of the screen can be brought close to white, and the contrast ratio of the screen is improved so that visibility can be improved. In the transmissive mode, since the light emitted from the backlight 106 passes through the third phase difference plate and the second polarizing plate, passes through the metal reflection film 36 as well and furthermore, passes through the liquid crystal layer 34, the first and second phase difference plates 14 and 15, and the first polarizing plate 17, the light display (white display) is lightened while the dark display (black display) is darkened and, therefore, the contrast ratio can be improved.

In particular, since the reflector 30 is configured by forming the metal reflection film 36 on the base material 35 with the concave portions 35a formed on the surface while the metal reflection film includes the plurality of concave surfaces 36a corresponding to the concave portions 35a, the ability of the reflector 30 to condense incident light is improved compared to that of the conventional reflection plate including concavities and convexities on the surface and, therefore, the reflectance can be increased. According to this, the light display in the reflective mode is lightened, the luminance and contrast ratio are improved and, therefore, superior display characteristics can be achieved.

Regarding the reflective liquid crystal display device 101 according to the present embodiment, the reflector 30 is placed on the external side of the liquid crystal cell 1, and when the reflector 30 is attached on the liquid crystal cell 1, adhesion can be performed at ambient temperature. Consequently, when the liquid crystal cell 1 and the reflector 30 are manufactured separately and, thereafter, the reflector 30 is retrofitted to this liquid crystal cell 1, since thermal stress is not applied to the liquid crystal cell 1 during manufacture of the reflector 30, and agents, etc., used during manufacture of the reflector 30 do not fall on the liquid crystal cell 1, degradation of the liquid crystal cell 1 can be prevented.

Regarding the semitransparent reflective liquid crystal display device 101 according to the present embodiment, by setting the angle of twisting of the liquid crystal 34 in the direction of the thickness thereof, the $\Delta nd_{LC}$ of the liquid crystal in the liquid crystal layer 34, the angle ($\phi_{RF1}$) which the lagging phase axis β of the first phase difference plate 14 forms with respect to the normal direction X, the $\Delta nd_{RF1}$ of the first phase difference plate 14, the angle ($\phi_{RF2}$) which the lagging phase axis γ of the second phase difference plate 15 forms with respect to the normal direction X, the $\Delta nd_{RF2}$ of the second phase difference plate 15, the angle ($\phi_{RF3}$) which the lagging phase axis δ of the third phase difference plate 13 forms with respect to the normal direction X, the $\Delta nd_{RF3}$ of the third phase difference plate 13, the angle ($\phi_{pol1}$) which the absorption axis α of the first polarizing plate 17 forms with respect to the normal direction X, and the angle ($\phi_{pol2}$) which the absorption axis ε of the second polarizing plate 16 forms with respect to the normal direction X within the preferable range, the white display (light display) becomes further well-lighted, and a liquid crystal display having further high contrast can be achieved.

By setting the $N_z$ coefficients represented by the Formula (1) of the first and second phase difference plates 14 and 15 within the preferable range, the range, in which contrast is excellent, is extended in the vertical and horizontal directions of the display surface and, therefore, the viewing angle is increased in the vertical and horizontal directions of the display surface, and a liquid crystal display having superior visual angle characteristic can be achieved.

Regarding the liquid crystal display device according to the present embodiment, the display surface 105 may be either landscape-oriented or portrait-oriented.

In addition, although a liquid crystal display having a topcoat 28 interposed between the upper orientation film 26 and the segment electrode 24 has been described, the topcoat 28 is not necessary. The topcoat 28 may be present or eliminated as appropriate in accordance with the type of the liquid crystal display device and required characteristics.

Regarding the liquid crystal display device according to the present embodiment, the black-and-white display type liquid crystal display device has been described. However, one or more color filters may be placed between the common electrode 23 and the lower glass substrate 12 thereby permitting configuration of a semitransparent reflective color liquid crystal display device. In that case, a first overcoat may be interposed between the common electrode 23 and the color filter to flatten the concavities and convexities caused by the color filter.

Regarding the semitransparent reflective liquid crystal display device 101 according to the present embodiment, a reflector 30 having a metal reflection film 36 with a symmetrical concave portion 36a constituting a part of a sphere has been described. However, a reflector 130 in which the shape of the concave portion 35a of the base material 35 is an asymmetric shape, as shown in FIG. 8 to FIG. 11, may be used instead of the former reflector 30.

Figure 8:
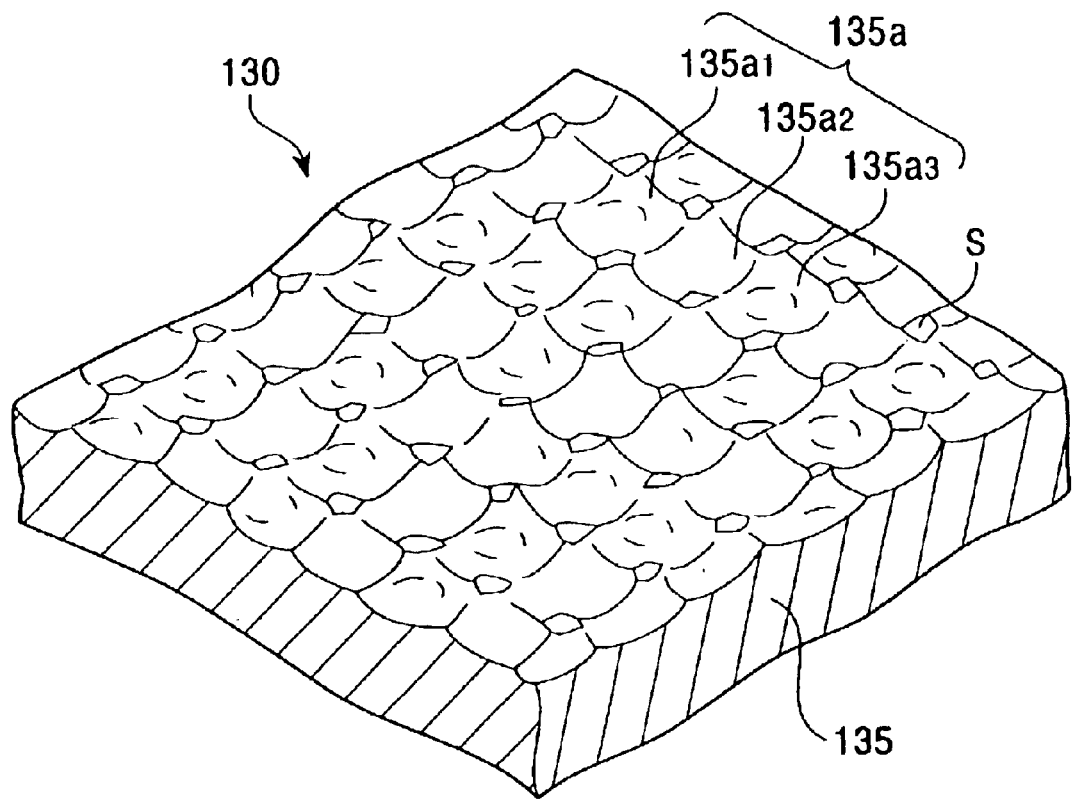
FIG. 8 is a perspective view showing another example of a reflector provided in the semitransparent reflective liquid crystal display device shown in FIG. 2.

The reflector 130 shown in FIG. 8 is configured, for example, by forming a metal reflection film having a film thickness of 5 to 50 nm, although not shown in the drawing, on a base material 135 in which a plurality of concave portions $135a_1$, $135a_2$, $135a_3$, and so forth (generally referred to as 135a) are randomly formed adjacently to each other on the surface S (reference plane) of a flat plate by means of an evaporation method, etc. Note that the reflector 130 may also be formed using a single layer fabricated by conventional techniques rather than a base material and metal reflection film. The amount of visible light transmitted through such a single layer should be equivalent to that transmitted through the above combination of base material and metal reflection film.

Figure 9:
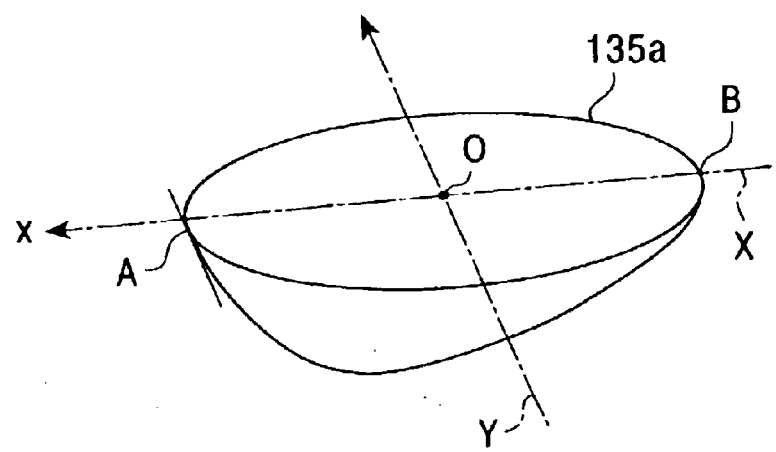
FIG. 9 is a perspective view showing a concave portion placed on the base material surface of the reflector shown in FIG. 8.
Figure 10:
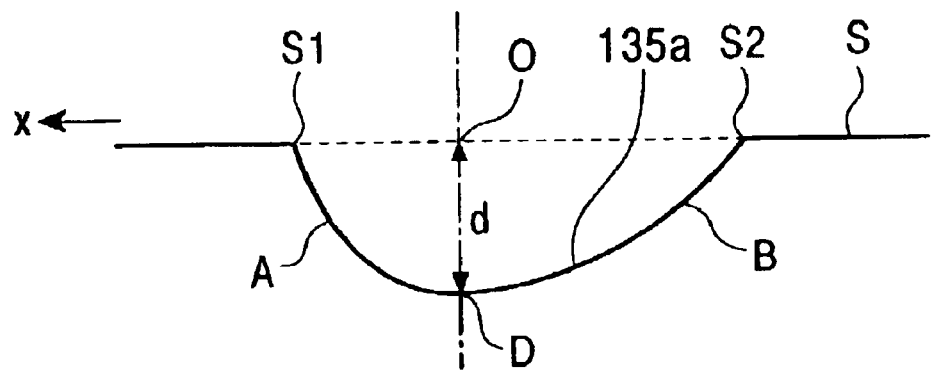
FIG. 10 is a sectional view in a first longitudinal section of the concave portion shown in FIG. 9.
Figure 11:
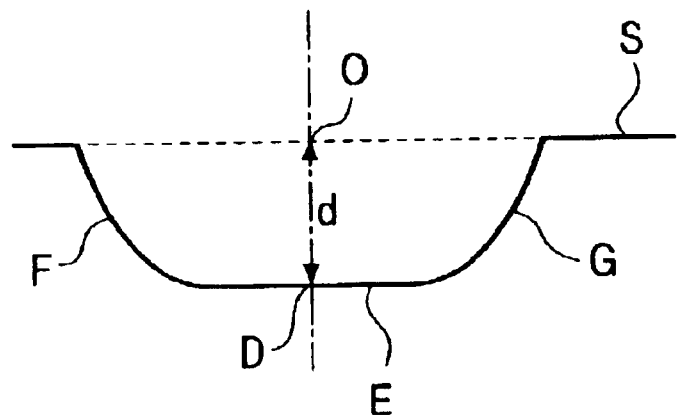
FIG. 11 is a sectional view in a second longitudinal section of the concave portion shown in FIG. 9.

FIGS. 9 to 11 show an inner surface shape of the concave portion 135a. FIG. 9 is a perspective view of the concave portion 135a, FIG. 10 is a sectional view of the longitudinal section X of the concave portion 135a, and FIG. 11 is a sectional view of the longitudinal section Y orthogonal to the longitudinal section X.

As shown in FIG. 10, the inner surface shape of the longitudinal section X of the concave portion 135a is composed of a first curve A from a first point S1 on the periphery of the concave portion 135a to the deepest point D and a second curve B from the deepest point D of the concave portion to a second point S2 on the periphery of the concave portion 135a in succession to this first curve A. In FIG. 10, both the angles of inclination of the downward-sloping first curve A and the upward-sloping second curve B become zero with respect to the base material surface S at the deepest point D and, therefore, these curves are connected gently to each other.

The angle of inclination of the first curve A with respect to the base material surface S is steeper than the angle of inclination of the second curve B, and the deepest point D is located at the position deviated from the center O of the concave portion 135a in the x direction. That is, the average value of the absolute values of the angles of inclination of the first curve A with respect to the base material surface S is larger than the average value of the absolute values of the angles of inclination of the second curve B with respect to the base material surface S. The average values of the absolute values of the angles of inclination of the first curve A in the concave portions $135a_1$, $135a_2$, $135a_3$, and so forth with respect to the base material surface S are varied randomly within the range of 2° to 90°. The average values of the absolute values of the angles of inclination of the second curve B in the concave portions $135a_1$, $135a_2$, $135a_3$, and so forth with respect to the base material surface S are varied randomly within the range of 1° to 89°.

On the other hand, as shown in FIG. 11, regarding the inner surface shape of the longitudinal section Y of the concave portion $135a$, the right and left are nearly equivalent with respect to the center O of the concave portion $135a$, and the periphery of the deepest point D is a shallow type curve E having a large curvature radius, that is, nearly linear. The right and left of the shallow type curve E are deep type curves F and G having a small curvature radius. The average values of the absolute values of the angles of inclination of the shallow type curves E in the concave portions $135a_1$, $135a_2$, $135a_3$, and so forth with respect to the base material surface S are mostly 10° or less. The average values of the absolute values of the angles of inclination of the deep type curves F and G in the concave portions $135a_1$, $135a_2$, $135a_3$, and so forth with respect to the base material surface S are also varied randomly, and are, for example, 2° to 90°.

The distance between the deepest point D and the base material surface S forms the depth d of the concave portion $135a$, and regarding the concave portions $135a_1$, $135a_2$, $135a_3$, and so forth, respective depths d are within the range of 0.1 μm to 3 μm, and are varied randomly.

In this reflector 30, each longitudinal section X in the concave portions $135a_1$, $135a_2$, $135a_3$, and so forth is in the same direction. Likewise, each longitudinal section Y in the concave portions $135a_1$, $135a_2$, $135a_3$, and so forth is in the same direction. Furthermore, each first curve A is unidirectionally oriented. That is, every concave portion is formed in order that the direction of x shown in FIG. 9 and FIG. 10 becomes identical.

Figure 12:
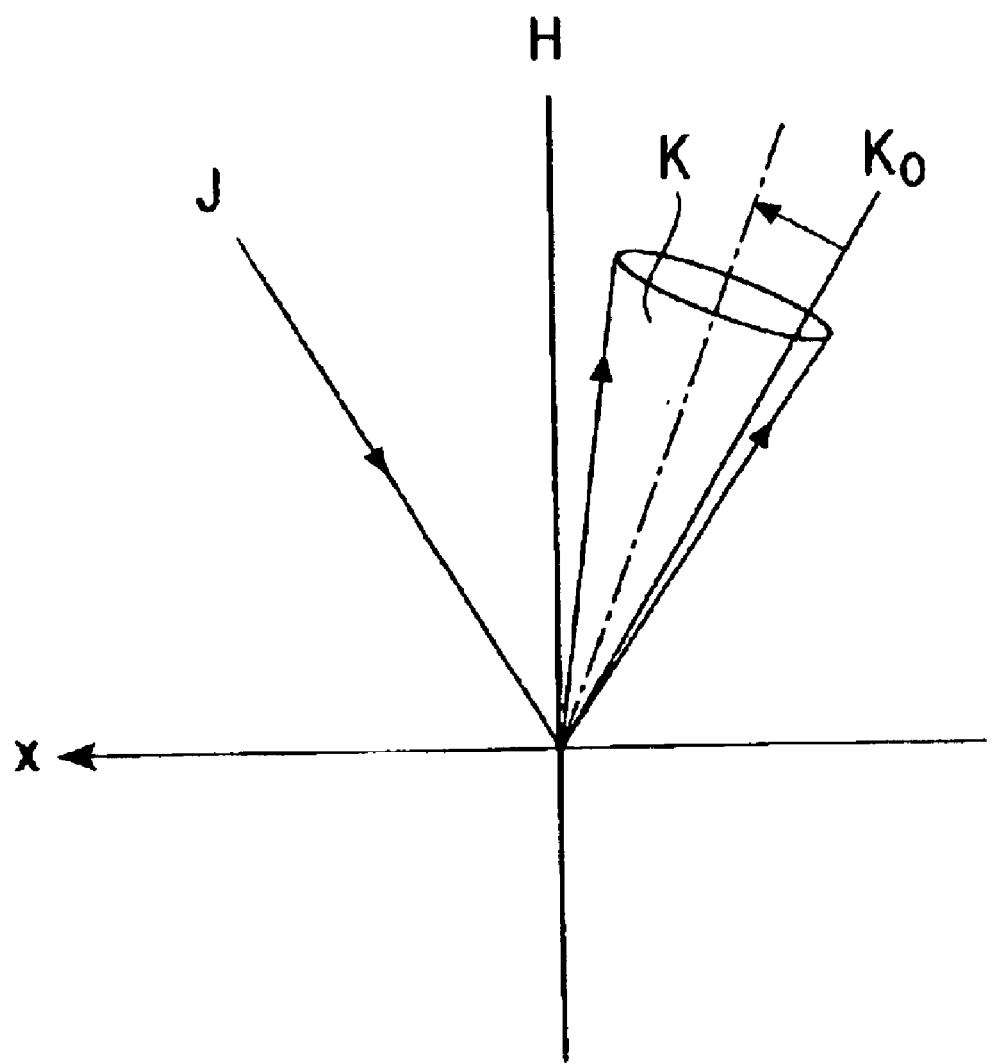
FIG. 12 is a schematic diagram explaining the reflection characteristics of the reflector shown in FIG. 8.

In this reflector 130, since each first curve A is oriented unidirectionally, the reflection characteristic thereof deviates from the direction of the specular reflection with respect to the base material surface S as shown in FIG. 12.

That is, as shown in FIG. 12, the well-lighted display range of reflected light K relative to obliquely incident light J from above the x direction is shifted in the direction shifted toward the H direction with respect to the base material surface S from the direction $K_0$ of the specular reflection.

Furthermore, since in the second longitudinal section Y orthogonal to the first longitudinal section X, each includes a shallow type curve E having a large curvature radius and deep type curves F and G existing on both sides of the shallow type curve E and having a small curvature radius, the reflectance in the direction of the specular reflection with respect to the base material surface S can be increased.

Figure 13:
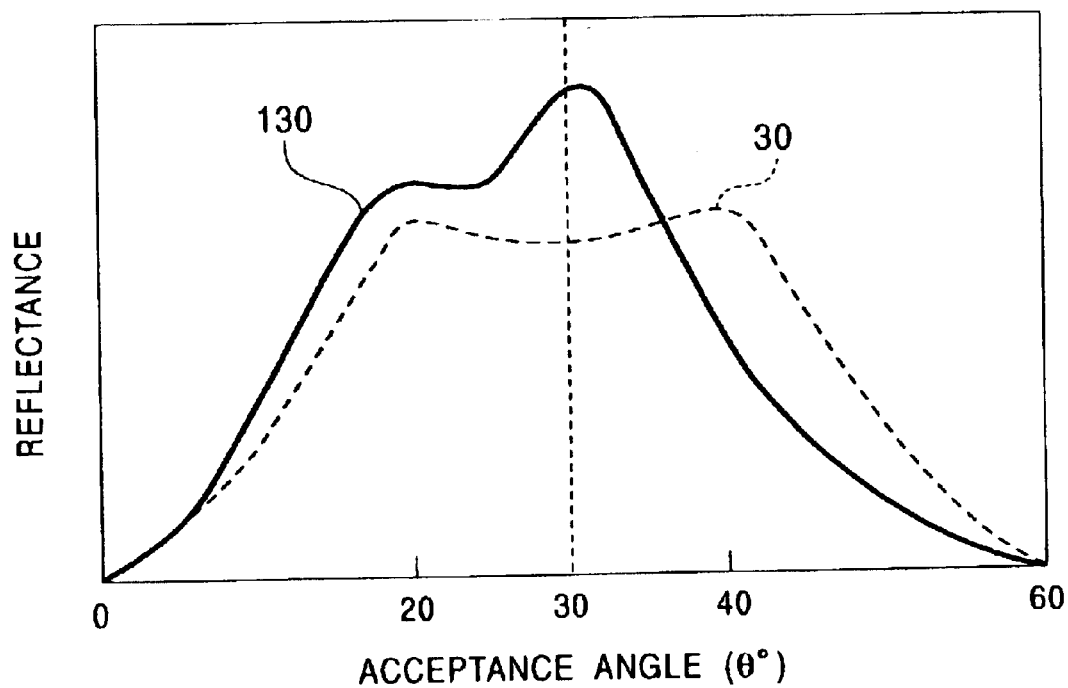
FIG. 13 is a graph showing the relationship between the acceptance angle and the reflectance.

Consequently, as shown in FIG. 13, regarding the total reflection characteristic in the first longitudinal section, the reflectance has a peak at the angle of the specular reflection and, in addition, the reflectance in the direction of reflection by the surface in the periphery of the second curve B is increased. That is, the reflection characteristic which adequately ensures the reflected light in the direction of the specular reflection and which moderately concentrates the reflected light in a specified direction can be achieved.

That is, FIG. 13 shows the relationship between the acceptance angle (θ°) and the brightness (reflectance) when the reflector 130 shown in FIG. 8 to FIG. 11 is radiated with external light at an incident angle of 30°, and the acceptance angle is varied relative to 30°, which is the direction of the specular reflection with respect to the display surface (base material surface), from the position of perpendicular (0°) to 60°. In FIG. 13, the relationship between the acceptance angle and the reflectance of the reflector 30 including sphere-shaped concave portions shown in FIG. 7 is also shown for purposes of comparison.

As is clear from FIG. 13, the reflector 30 exhibits nearly even reflectance at the acceptance angle within a range of about 15° to about 45°, while regarding the reflector 130, the reflectance has a peak at the angle of 30° which is the angle of the specular reflection with respect to the base material surface S and, in addition, the integral of reflectance within the range of the reflection angle smaller than 30°, which is the angle of the specular reflection, is larger than the integral of reflectance within the range of the reflection angle larger than the angle of the specular reflection. That is, the brightness in the direction of the specular reflection is ensured and, in addition, adequate brightness is achieved in the visual field at an angle in the neighborhood of 20°.

Figure 14:
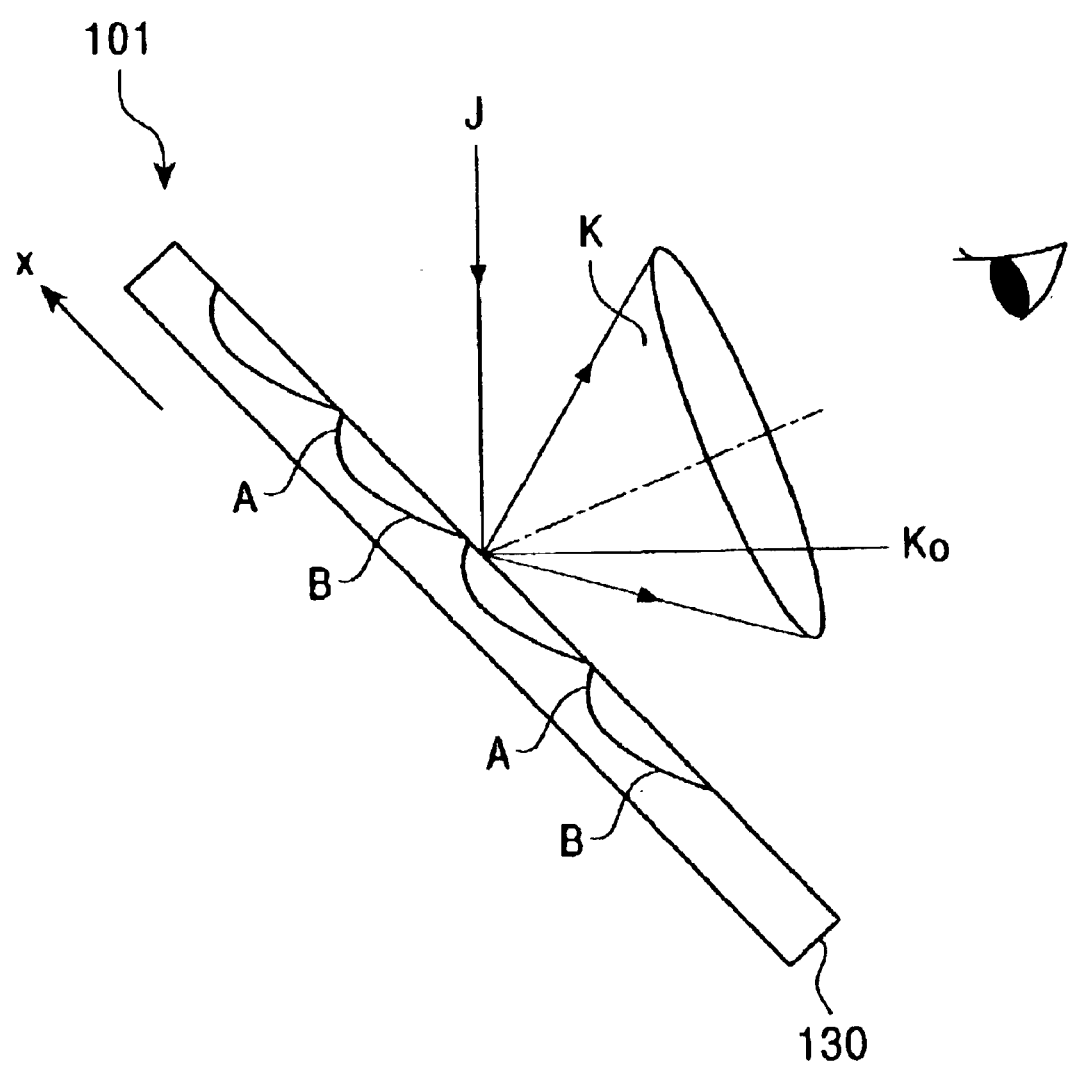
FIG. 14 is a schematic diagram explaining the use of a semitransparent reflective liquid crystal display device according to the present embodiment provided with the reflector shown in FIG. 8.

FIG. 14 is an illustrative diagram showing the use of the semitransparent reflective liquid crystal display device 101 according to the present embodiment provided with the reflector 130. In FIG. 14, for convenience in description, only the first curve A and the second curve B of the reflector 130 are shown in the drawing, and the other constituents are omitted from the drawing.

When such a semitransparent reflective liquid crystal display device 101 is incorporated in a cellular phone, notebook computer, etc., the x direction is up. In this case, usually, the semitransparent reflective liquid crystal display device 101 is placed or held obliquely with respect to the horizontal surface while the x direction is obliquely above as shown in FIG. 14. That is, the first curves A in respective concave portions are located above the second curves B when viewed from the observer during use. In general, the observer looks down at this liquid crystal display device 101 from obliquely above rather than from a horizontal position.

In this case, the reflected light K of the external light (incident light J) primarily incident from above is reflected at the surface in the periphery of the second curve B, is unlikely to be reflected in the direction toward the feet of the observer, as has been described regarding FIG. 12, and therefore, is reflected primarily in the direction above the direction $K_0$ of the specular reflection.

Consequently, the normal observation range of the observer agrees with the well-lighted display range and, therefore, a well-lighted liquid crystal display device can be realized practically.

EXAMPLES

The present invention will be further specifically described below using Examples and Comparative examples. However, the present invention is not limited to only these Examples.

(Experiment 1)

Examinations were performed regarding the display characteristics of the semitransparent reflective liquid crystal display devices according to the embodiments shown in FIG. 1 to FIG. 6 in the reflective mode.

Herein, PSI-2501 (trade name; manufactured by Chisso Corporation) was used as upper and lower orientation films constituting the liquid crystal cell, and an orientation treatment was performed in order that the twist angle of the liquid crystal became 240 degrees. The angle, which the orientation direction a of the upper orientation film formed with respect to the normal direction X, was +330 degrees (−30 degrees) when viewed from the incident side of the light, and the angle, which the orientation direction b of the lower orientation film formed with respect to the normal direction X, was +30 degrees when viewed from the incident side of the light. AP-4365LF (trade name; manufactured by Chisso Petrochemical Corporation) was used as the liquid crystal in the liquid crystal layer. NRZ-170 (trade name; manufactured by Nitto Denko Corporation, material: polycarbonate) was used as the first phase difference plate, NRZ-450 (trade name; manufactured by Nitto Denko Corporation, material: polycarbonate) was used as the second phase difference plate, and NPF-SEG1425DU (trade name; manufactured by Nitto Denko Corporation) was used as the first polarizing plate.

An acryl-based photosensitive resin base material (resin base material for reflector), in which a concave and convex surface was formed on the surface by a silicone mold including concave and convex portions, was radiated with an ultraviolet ray and was cured, an Al film (metal reflection film) 25 nm in thickness was formed on this photosensitive resin base material, and the resulting combination was used as the reflector. The concave and convex surface on the surface of this reflector was provided with a metal thin film including concave surfaces in the shape constituting a part of a sphere as shown in FIG. 7.

Each of the $\Delta nd_{LC}$ (measurement wavelength 589 nm) of the liquid crystal cell, the $\Delta nd_{RF1}$ of the first phase difference plate, the angle ($\phi_{RF1}$) which the lagging phase axis β of the first phase difference plate formed with respect to the normal direction X, the $\Delta nd_{RF2}$ of the second phase difference plate, the angle ($\phi_{RF2}$) which the lagging phase axis γ of the second phase difference plate formed with respect to the normal direction X, and the angle ($\phi_{pol1}$) which the absorption axis α of the first polarizing plate formed with respect to the normal direction X was set as shown in the following Table 1 (Sample Nos. 1 to 17).

The display characteristics of the reflective liquid crystal display device of Sample Nos. 1 to 17 were examined as described below. Herein, regarding the display characteristics, a light source, the first polarizing plate, the second phase difference plate, the first phase difference plate, the liquid crystal cell, and the reflector were arranged in that order, light was entered into the liquid crystal cell from the direction at an azimuth angle of 90 degrees counterclockwise and the direction at −30 degrees from the Z direction (the normal direction) shown in FIG. 3 and FIG. 4, and the value of Y (brightness) and the contrast in the white display condition (applied voltage 2.20 V) of a normally black display system (N/B) in the case where the reflected light in the Z direction was received at an acceptance angle of 0 degree were evaluated. Regarding the evaluation criteria, when the Y value exceeded 40, the brightness was evaluated as excellent, and when the contrast exceeded 50, the contrast was evaluated as excellent. The results are collectively shown in the following Table 1 and Table 2.

TABLE 1

| Sample No. | Liquid crystal layer $\Delta nd_{LC}$ (nm) | First phase difference plate $\Delta nd_{RF1}$ (nm) | First phase difference plate $\phi_{RF1}$ (°) | Second phase difference plate $\Delta nd_{RF2}$ (nm) | Second phase difference plate $\phi_{RF2}$ (°) | First polarizing plate $\phi_{pol1}$ (°) | Y | Contrast |
|---|---|---|---|---|---|---|---|---|
| 1 | 630 | 175 | 80.0 | 330 | 122.0 | 62.0 | 40.71 | 77.2 |
| 2 | 650 | 175 | 80.0 | 330 | 122.0 | 62.0 | 43.03 | 219.8 |
| 3 | 670 | 175 | 80.0 | 340 | 120.0 | 54.0 | 44.71 | 53.2 |
| 4 | 700 | 131 | 68.0 | 377 | 99.0 | 24.5 | 43.78 | 93.5 |
| 5 | 720 | 140 | 70.0 | 410 | 100.0 | 25.0 | 46.44 | 111.3 |
| 6 | 720 | 160 | 80.0 | 370 | 114.0 | 40.0 | 47.31 | 51.0 |
| 7 | 720 | 180 | 90.0 | 330 | 130.0 | 65.0 | 47.17 | 59.2 |
| 8 | 740 | 170 | 85.0 | 370 | 124.0 | 53.0 | 46.66 | 57.3 |
| 9 | 760 | 170 | 75.0 | 450 | 105.0 | 34.0 | 47.10 | 64.4 |
| 10 | 780 | 170 | 75.0 | 450 | 105.0 | 34.0 | 44.07 | 86.6 |

TABLE 2

| Sample No. | Liquid crystal layer $\Delta nd_{LC}$ (nm) | First phase difference plate $\Delta nd_{RF1}$ (nm) | First phase difference plate $\phi_{RF1}$ (°) | Second phase difference plate $\Delta nd_{RF2}$ (nm) | Second phase difference plate $\phi_{RF2}$ (°) | First polarizing plate $\phi_{pol1}$ (°) | Y | Contrast |
|---|---|---|---|---|---|---|---|---|
| 11 | 580 | 175 | 80.0 | 330 | 122.0 | 62.0 | 41.2 | 8.3 |
| 12 | 630 | 210 | 80.0 | 330 | 122.0 | 62.0 | 38.4 | 9.1 |
| 13 | 630 | 175 | 55.0 | 330 | 122.0 | 62.0 | 46.3 | 1.8 |
| 14 | 630 | 175 | 80.0 | 290 | 122.0 | 62.0 | 31.0 | 32.4 |
| 15 | 630 | 175 | 80.0 | 330 | 145.0 | 62.0 | 43.5 | 1.2 |
| 16 | 630 | 175 | 80.0 | 330 | 122.0 | 15.0 | 47.4 | 1.6 |
| 17 | 630 | 175 | 80.0 | 330 | 122.0 | 75.0 | 44.2 | 5.5 |

As is clear from the results shown in Table 1 and Table 2, regarding Sample Nos. 11 to 17, if any one of the $\Delta nd_{LC}$ of the liquid crystal cell, the $\Delta nd_{RF1}$ of the first phase difference plate, the angle ($\phi_{RF1}$) which the lagging phase axis β of the first phase difference plate formed with respect to the normal direction X, the $\Delta nd_{RF2}$ of the second phase difference plate, the angle ($\phi_{RF2}$) which the lagging phase axis γ of the second phase difference plate formed with respect to the normal direction X, and the angle ($\phi_{pol1}$) which the absorption axis α of the first polarizing plate formed with respect to the normal direction X was not set within the preferable range, in the reflective mode, the contrast was less than 33, or the Y value in the white display condition was less than 39 and, therefore, the brightness was reduced.

On the other hand, regarding Sample Nos. 1 to 10, in which all the $\Delta nd_{LC}$ of the liquid crystal cell, the $\Delta nd_{RF1}$ of the first phase difference plate, the angle ($\phi_{RF1}$) which the lagging phase axis β of the first phase difference plate forms with respect to the normal direction X, the $\Delta nd_{RF2}$ of the second phase difference plate, the angle ($\phi_{RF2}$) which the lagging phase axis γ of the second phase difference plate forms with respect to the normal direction X, and the angle ($\phi_{pol1}$) which the absorption axis α of the first polarizing plate forms with respect to the normal direction X are set within the preferable range, in the reflective mode, the contrast exceeds 51, furthermore, the Y value in the white display condition exceeds 40 and, therefore, it is well-lighted. Consequently, it is clear that the white display is well-lighted, the contrast is high, and, therefore, superior display characteristics are achieved. In particular, regarding those in Sample Nos. 2 and 5, well-lighted white display and high contrast of 110 or more have been achieved.

(Experiment 2)

As an Example, the display characteristics of the semitransparent reflective liquid crystal display device of Sample No. 4 were examined as described below.

Herein, regarding the display characteristics, light (diameter 22 mm and luminous flux 500 lux) from a light source impinged on the liquid crystal cell from the direction at an azimuth angle of 330 degrees and the direction at 15 degrees from the Z direction (the direction orthogonal to respective surfaces on the incident side of the liquid crystal cell 1, the first phase difference plate 14, the second phase difference plate 15, and the first polarizing plate 17) shown in FIG. 3, and the reflectance and the contrast were examined. The results thereof are shown in FIG. 15 and FIG. 16.

Figure 15:
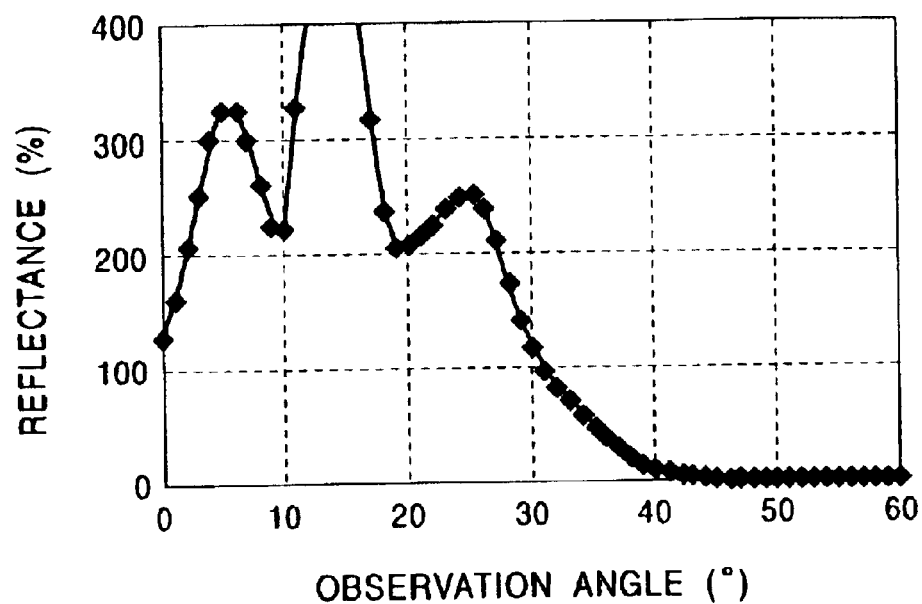
FIG. 15 is a graph showing the reflectance in Example (Sample No. 4) when light is entered at 15 degrees.
Figure 16:
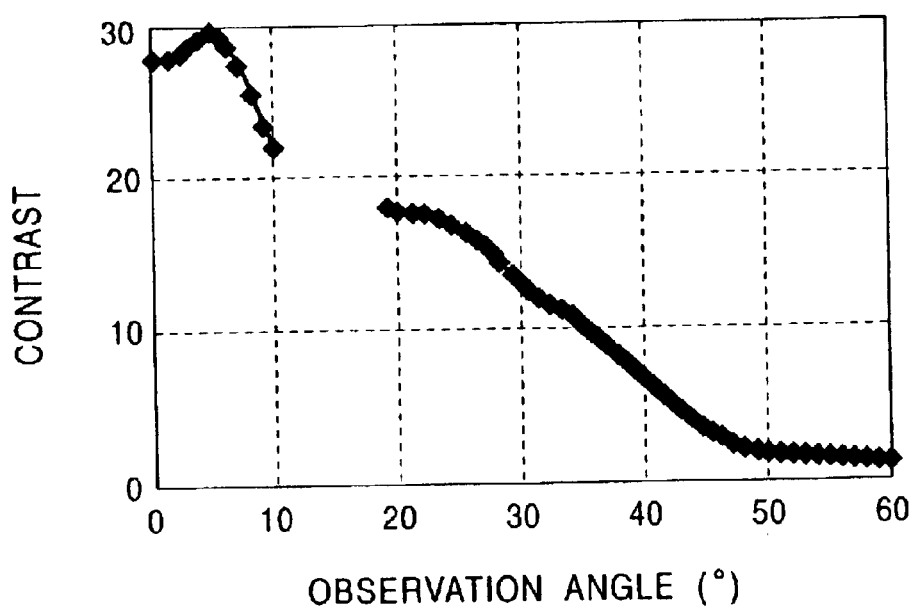
FIG. 16 is a graph showing the contrast in Example (Sample No. 4) when light is entered at 15 degrees.

FIG. 15 is a diagram showing the relationship between the observation angle (acceptance angle) and the reflectance when light impinged at 15 degrees onto the semitransparent reflective liquid crystal display device in the Example. FIG. 16 is a diagram showing the relationship between the observation angle (acceptance angle) and the contrast when light impinged 15 degrees onto the semitransparent reflective liquid crystal display device in the Example.

Figure 19:
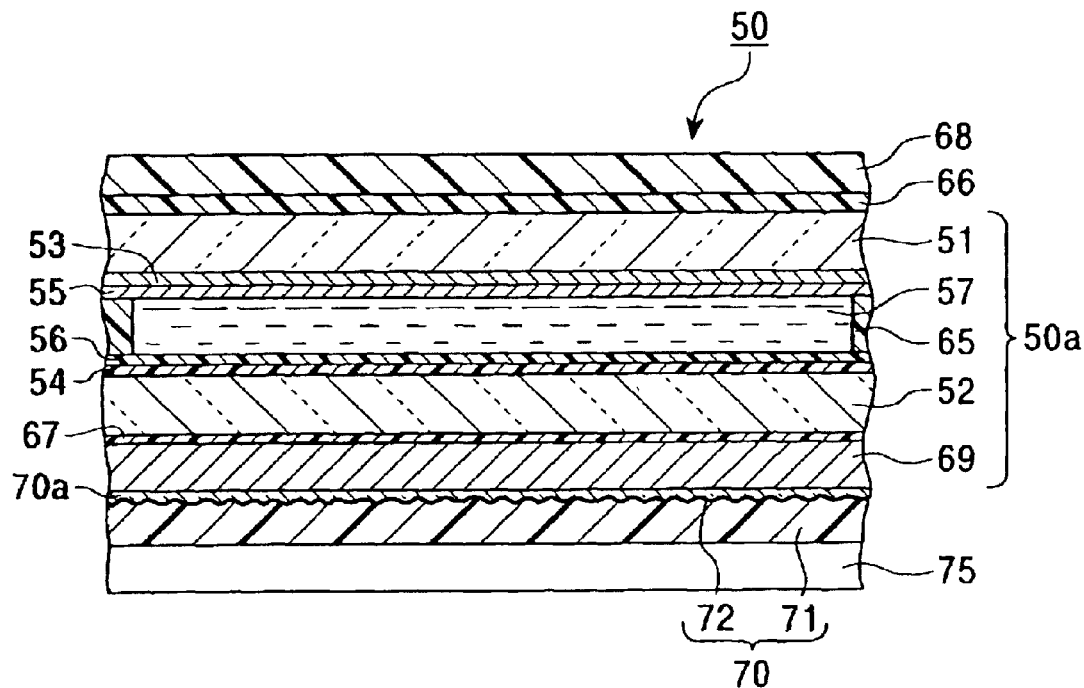
FIG. 19 is a sectional view showing the outline configuration of a conventional semitransparent reflective liquid crystal display device.
Figure 20:
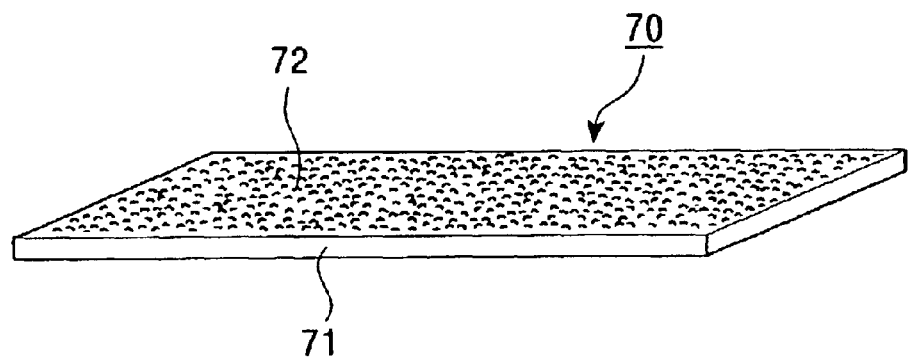
FIG. 20 is a perspective view showing a reflection plate provided in the semitransparent reflective liquid crystal display device shown in FIG. 19.

As Comparative example, the display characteristics of the semitransparent reflective liquid crystal display device of the Comparative example shown in FIG. 19 and FIG. 20 were examined.

AP-4268LA (trade name; manufactured by Chisso Petrochemical Corporation) was used as the liquid crystal in the semitransparent reflective liquid crystal display device of the Comparative example. The Δnd (the product of the double refractive index Δn of the liquid crystal in the liquid crystal layer and the thickness d of the liquid crystal layer) of the liquid crystal cell was 860 nm (measurement wavelength 589 nm). NRF-430 (trade name; manufactured by Nitto Denko Corporation, material: polycarbonate) was used as the first phase difference plate, NRF-430 (trade name; manufactured by Nitto Denko Corporation, material: polycarbonate) was used as the second phase difference plate. NPF-EG-1225DU (trade name; manufactured by Nitto Denko Corporation) was used as the upper polarizing plate (first polarizing plate). NPF-EG-1225DU (trade name; manufactured by Nitto Denko Corporation) was used as the lower polarizing plate (second polarizing plate). A concave and convex surface was formed on the surface of a resin film by a sandblast treatment, an Al film on the order of 26 to 28 nm in thickness (the total light transmittance (T) of the Al film=10%) was formed on this concave and convex surface by an evaporation method, and the resulting one was used as the reflector. The other materials used were similar to those used in the Example.

Regarding the semitransparent reflective liquid crystal display device in this Comparative example, the Δnd of the liquid crystal cell was set at 860 nm, the retardation of the first phase difference plate was set at 430 nm, the angle which the lagging phase axis of the first phase difference plate formed with respect to the normal direction X was set at 70 degrees counterclockwise when viewed from the incident side of the light, the retardation of the second phase difference plate was set at 430 nm, the angle which the lagging phase axis of the second phase difference plate formed with respect to the normal direction X was set at 25 degrees counterclockwise when viewed from the incident side of the light, the angle which the absorption axis of the first polarizing plate (upper polarizing plate) formed with respect to the normal direction X was set at 5 degrees counterclockwise when viewed from the incident side of the light, and the angle which the absorption axis of the second polarizing plate (lower polarizing plate) formed with respect to the normal direction X was set at 5 degrees counterclockwise when viewed from the incident side of the light.

In a manner similar to that in the Example, the relationship between the observation angle (acceptance angle) and the reflectance when light impinged at 15 degrees and the relationship between the observation angle (acceptance angle) and the contrast when light impinged at 15 degrees were examined. The results thereof are shown in FIG. 17 and FIG. 18.

Figure 17:
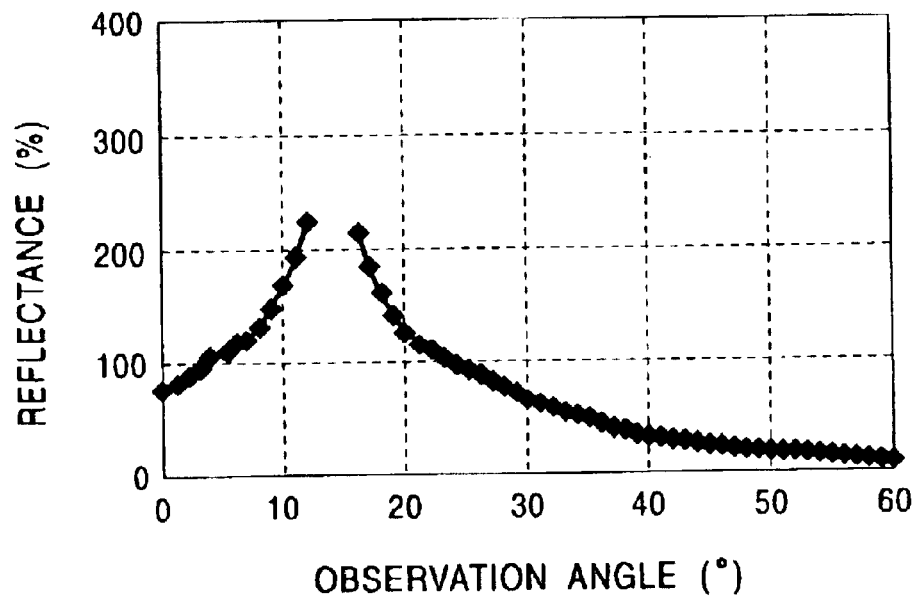
FIG. 17 is a graph showing the reflectance in Comparative example when light is entered at 15 degrees.
Figure 18:
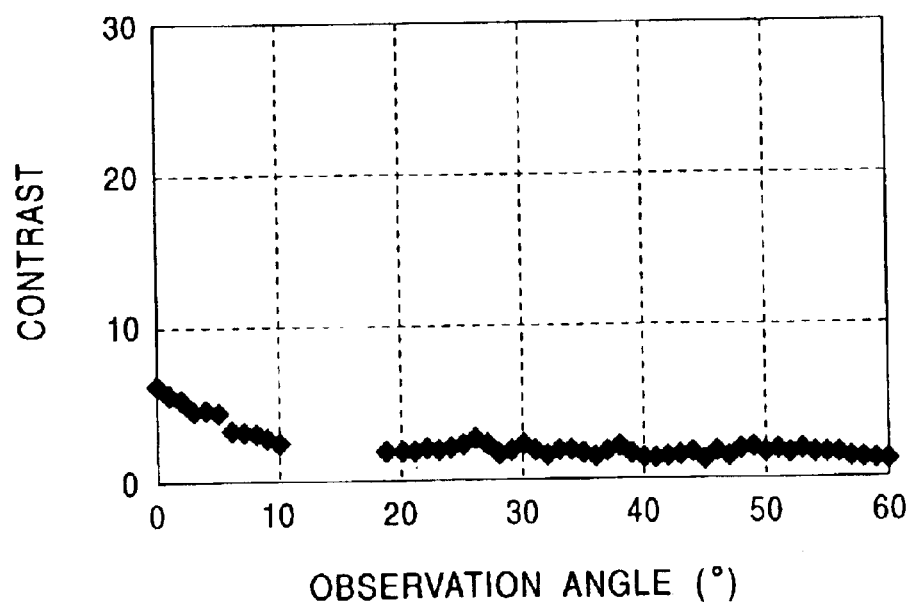
FIG. 18 is a graph showing the contrast in Comparative example when light is entered at 15 degrees.

FIG. 17 is a diagram showing the relationship between the observation angle (acceptance angle) and the reflectance when light impinged at 15 degrees into the semitransparent reflective liquid crystal display device in the Comparative example, and FIG. 18 is a diagram showing the relationship between the observation angle (acceptance angle) and the contrast when light impinged at 15 degrees into the semitransparent reflective liquid crystal display device in the Comparative example.

When the results shown in FIG. 15 and FIG. 17 are compared, it is clear that the range, in which the reflectance in the light display condition is high, of the semitransparent reflective liquid crystal display device in the Example is wider than that of the semitransparent reflective liquid crystal display device in the Comparative example. In particular, it is clear that when the observation angle is 0° to 12° and 16° to 34°, the reflectance of the semitransparent reflective liquid crystal display device in the Example is higher than that of the semitransparent reflective liquid crystal display device in the Comparative example.

When the results shown in FIG. 16 and FIG. 18 are compared, it is clear that the range, in which the contrast of display surface is large, of the semitransparent reflective liquid crystal display device in the Example is wider than that in the Comparative example. In particular, it is clear that when the observation angle is 0° to 10° and 18° to 46°, the contrast of the semitransparent reflective liquid crystal display device in the Example is higher than that of the semitransparent reflective liquid crystal display device in the Comparative example. Consequently, it has been made clear that according to the semitransparent reflective liquid crystal display device in the Example, a display surface having a wide viewing angle has been able to achieve, and the visual angle dependence has been able to improve.

(Experiment 3)

Examinations were performed regarding the display characteristics of the semitransparent reflective liquid crystal display devices according to the embodiments shown in FIG. 1 to FIG. 6 in the transmissive mode.

Herein, PSI-2501 (trade name; manufactured by Chisso Corporation) was used as upper and lower orientation films constituting the liquid crystal cell, and an orientation treatment was performed in order that the twist angle of the liquid crystal became 240 degrees. The angle, which the orientation direction a of the upper orientation film formed with respect to the normal direction X, was +330 degrees (−30 degrees) when viewed from the incident side of the light, and the angle, which the orientation direction b of the lower orientation film formed with respect to the normal direction X, was +30 degrees when viewed from the incident side of the light. AP-4365LF (trade name; manufactured by Chisso Petrochemical Corporation) was used as the liquid crystal in the liquid crystal layer. NRZ-RF01A (trade name; manufactured by Nitto Denko Corporation, material: polycarbonate) was used as the first and second phase difference plates, NRF-9F01A (trade name; manufactured by Nitto Denko Corporation, material: polycarbonate) was used as the third phase difference plate, NPF-SEG1224DU (trade name; manufactured by Nitto Denko Corporation) was used as the first polarizing plate, and NPF-SEG1224DU (trade name; manufactured by Nitto Denko Corporation) was used as the second polarizing plate.

An acryl-based photosensitive resin base material (resin base material for reflector), in which a concave and convex surface was formed on the surface by a silicone mold including concave and convex portions, was radiated with an ultraviolet ray and was cured, an Al film (metal reflection film) 25 nm in thickness was formed on this photosensitive resin base material, and the resulting combination was used as the reflector. The concave and convex surface on the surface of this reflector was provided with a metal thin film including concave surfaces in the shape constituting a part of a sphere, as shown in FIG. 7.

The $\Delta nd_{LC}$ (measurement wavelength 589 nm) of the liquid crystal cell was set at 700 nm, the $\Delta nd_{RF1}$ of the first phase difference plate was set at 170 nm, the angle ($\phi_{RF1}$), which the lagging phase axis β of the first phase difference plate formed with respect to the normal direction X, was set at 80 degrees, the $\Delta nd_{RF2}$ of the second phase difference plate was set at 425 nm, the angle ($\phi_{RF2}$), which the lagging phase axis γ of the second phase difference plate formed with respect to the normal direction X, was set at 113 degrees, the angle ($\phi_{pol1}$), which the absorption axis α of the first polarizing plate formed with respect to the normal direction X, was set at 42 degrees.

Each of the $\Delta nd_{RF3}$ of the third phase difference plate, the angle ($\phi_{RF3}$), which the lagging phase axis δ of the third phase difference plate formed with respect to the normal direction X, and the angle ($\phi_{pol2}$), which the absorption axis ε of the second polarizing plate formed with respect to the normal direction X, was set as shown in the following Table 3 (Sample Nos. 18 to 34).

The display characteristics of the semitransparent reflective liquid crystal display devices of Sample Nos. 18 to 34 were examined as described below. Herein, regarding the display characteristics, the first polarizing plate, the second phase difference plate, the first phase difference plate, the liquid crystal cell, the reflector, the third phase difference plate, the second polarizing plate, and the light source were arranged in that order, light impinged onto the liquid crystal cell from the direction at an azimuth angle of 20 degrees counterclockwise and the direction opposite to the Z direction (the normal direction) shown in FIG. 3 to FIG. 6, and the value of W (brightness) in the white display condition (applied voltage 2.20 V) of a normally black display system (N/B), the value of B (brightness) in the black display condition (applied voltage 25 V), and the contrast in the case where the transmitted light in the Z direction was received at an acceptance angle of 0 degree were evaluated. The results are shown in the following Table 3.

TABLE 3

| Sample No. | Third phase difference plate | | Second polarizing plate | W | B | Contrast |
|---|---|---|---|---|---|---|
| | $\Delta nd_{RF3}$ (nm) | $\phi_{RF3}$ (°) | $\phi_{pol2}$ (°) | | | |
| 18 | 140 | 76 | 34 | 15.60 | 2.260 | 6.90 |
| 19 | 133 | 58 | 13 | 18.90 | 1.010 | 18.71 |
| 20 | 133 | 58 | 13 | 17.50 | 0.990 | 17.68 |
| 21 | 137.5 | 90 | 33 | 27.80 | 1.700 | 16.35 |
| 22 | 133 | 58 | 13 | 19.85 | 0.814 | 24.39 |
| 23 | 133 | 58 | 13 | 18.40 | 0.850 | 21.65 |
| 24 | 133 | 29 | −10 | 22.80 | 1.390 | 16.40 |
| 25 | 120 | 58 | 13 | 15.30 | 1.430 | 10.70 |
| 26 | 125 | 58 | 13 | 20.67 | 0.834 | 24.78 |
| 27 | 125 | 72 | 13 | 27.00 | 1.350 | 20.00 |
| 28 | 125 | 65 | 13 | 22.30 | 1.010 | 22.08 |
| 29 | 125 | 62 | 13 | 31.15 | 0.920 | 22.99 |
| 30 | 125 | 60 | 13 | 20.81 | 0.890 | 23.38 |
| 31 | 125 | 58 | 13 | 20.81 | 0.840 | 24.77 |
| 32 | 125 | 58 | 13 | 21.44 | 0.940 | 22.81 |
| 33 | 125 | 54 | 13 | 22.20 | 0.990 | 22.42 |
| 34 | 125 | 50 | 13 | 23.30 | 1.090 | 21.38 |

Among Samples shown in Table 3, regarding Samples 18 to 24, improvement of the luminance of the liquid crystal display device was intended by primarily increasing the brightness of the white display. Among Samples 18 to 24, especially, regarding Sample 21, the brightness (W) of the white display reaches 27.8 and, therefore, the liquid crystal display device having extremely high luminance has been achieved. Regarding the other Samples 18 to 20 and 22 to 24, it is clear that each parameter of the $\Delta nd_{RF3}$ and $\phi_{RF3}$ of the third phase difference plate and ($\phi_{pol2}$) of the second polarizing plate is outside the optimum range for increasing the luminance and, therefore, inadequate values are exhibited with respect to the brightness (W) of the white display.

Among Samples shown in Table 3, regarding Samples 25 to 34, improvement of the contrast was intended by primarily increasing the difference between the brightness of the white display and the brightness of the black display. Among Samples 25 to 34, especially, regarding Samples 26 and 31, the contrast ratios reach 24.77 to 24.78 and, therefore, extremely high contrast ratios have been achieved. Samples 27 to 30 and 32 to 34 also exhibit contrast ratios of 20 or more and, therefore, it is clear that excellent contrast ratios have been achieved.

On the other hand, regarding Sample 25, it is clear that each parameter of the $\Delta nd_{RF3}$ and $\phi_{RF3}$ of the third phase difference plate and ($\phi_{pol2}$) of the second polarizing plate is outside the optimum range for increasing the contrast and, therefore, an inadequate value is exhibited with respect to the contrast.

(Experiment 4)

An organic film having a film thickness of 2 μm made of a photosensitive resin was formed on the third phase difference plate made of polycarbonate, an aluminum film of 9 nm is formed as the metal reflection film on this organic film, an adhesive layer of 25 μcovering this organic film and the metal reflection film was laminated, the lower glass substrate was attached thereon, the electrode layer and the lower orientation film were further laminated sequentially on the lower glass substrate and, therefore, a substrate for a liquid crystal device was formed. The surface shape of the organic film was made to be the shape in which a plurality of concave portions, each having an inner surface constituting a part of a sphere, were formed on the surface while being controlled to have depths of 0.6 μm to 1.2 μm, distribution of inclination of inner surfaces of −8 degrees to 8 degrees, and pitches of 26.5 μm to 36.5 μm.

This substrate for the liquid crystal device and the upper glass substrate provided with an electrode layer, an orientation film, etc., prepared separately faced each other, and were integrated by adhesion with a sealing member to produce a liquid crystal cell.

Subsequently, the first to third phase difference plates, the first and second polarizing plates, and a backlight were attached to this liquid crystal cell and, therefore, a semitransparent reflective liquid crystal display device of Sample 36 as shown in FIG. 1 was manufactured.

Furthermore, semitransparent reflective liquid crystal display devices (Samples 37 to 43) having configurations equivalent to that of the Sample 36 except that aluminum films having film thicknesses shown in the following table was formed as the metal reflection film were manufactured.

| Film thickness of metal reflection film | |
|---|---|
| Sample 37 | 10 nm |
| Sample 38 | 15 nm |
| Sample 39 | 20 nm |
| Sample 40 | 30 nm |
| Sample 41 | 7.5 nm |
| Sample 42 | 32.5 nm |
| Sample 43 | 100 nm |

Regarding each of the semitransparent reflective liquid crystal display device of Samples 36 to 43, the brightness of the display was evaluated in the reflective mode without lighting up of the backlight and in the transmissive mode with lighting up of the backlight. An evaluation system of classification into four categories shown in the following table was adopted, and evaluations were performed regarding three items including each of the reflective mode and transmissive mode and, in addition, the total evaluation derived from these evaluation results.
(Evaluation)
   A extremely well-lighted and easy on the eyes
   B well-lighted and easy on the eyes
   C slightly dark
   D brightness is inadequate, but display can be visually identified The evaluation results of each Sample are shown in the following table. As shown in the table, the liquid crystal display devices of Samples 36 and 37 exhibited excellent brightness and the displays were easy on the eyes by a large degree in both reflective mode and transmissive mode. The liquid crystal display devices of Samples 38 to 40 exhibited brightness slightly inferior to those of Samples 36 and 37 in the transmissive mode, and accompanying that, reduction in visibility was observed. Regarding the liquid crystal display device of Sample 40 having the reflection film thickness of 30 nm, there was a difference between the brightness of the display in the transmissive mode and that in the reflective mode and, therefore, although the brightness was adequate for use as the brightness of the display, easiness on the eyes of the display tended to be slightly poor in the use while the transmissive mode and the reflective mode were switched. Regarding the brightness of Samples 38 to 40 in the transmissive mode, the liquid crystal display device of Sample 38 was lightest, that of the Sample 40 was darkest, and that of the Sample 39 exhibited intermediate brightness.

On the other hand, in the liquid crystal display device of Sample 41, the display was slightly dark in the reflective mode, and in the liquid crystal display device of Sample 42, the display was slightly dark in the reflective mode and, therefore, the displays were clearly not easy on the eyes. Since the liquid crystal display device of Sample 43 hardly transmitted light, the display in the transmissive mode was clearly inferior. It is believed that Samples 41 to 43 were evaluated as poor because the film thicknesses of the metal reflection films were outside the range of 5 to 50 nm.

| | Film thickness of metal reflection film | Evaluation in reflective mode | Evaluation in transmissive mode | Total evaluation |
|---|---|---|---|---|
| Sample 36 | 9 nm | A | A | A |
| Sample 37 | 10 nm | A | A | A |
| Sample 38 | 15 nm | A | B | B |
| Sample 39 | 20 nm | A | B | B |
| Sample 40 | 30 nm | A | B | B |
| Sample 41 | 7.5 nm | C | A | C |
| Sample 42 | 32.5 nm | A | C | C |
| Sample 43 | 100 nm | A | D | D |

As described above in detail, according to the liquid crystal display device of the present invention, since the second polarizing plate is placed outside the reflector including the metal reflection film having a film thickness of 5 to 50 nm, in the reflective mode, the incident light is reflected by the metal reflection film and, therefore, does not pass through the second polarizing plate. Consequently, the spectral characteristic is not degraded, the color of the screen of the liquid crystal display device can be brought close to white, the contrast ratio of the screen is improved and, therefore, the visibility can be improved. In the transmissive mode, since the light emitted from the backlight passes through the third phase difference plate and the second polarizing plate, passes through the metal reflection film as well, and furthermore, passes through the liquid crystal layer, the first and second phase difference plate, and the first polarizing plate, the light display (white display) is lightened while the dark display (black display) is darkened and, therefore, the contrast ratio can be improved.

In particular, since the reflector is configured by forming the metal reflection film on the base material with concave portions formed on the surface while the metal reflection film includes concave surfaces corresponding to the concave portions, the ability of the reflector to condense light is enhanced and, therefore, the reflectance can be increased compared to reflectance in a conventional reflection plate including concavities and convexities on the surface. According to this, the light display in the reflective mode is lightened, the luminance and the contrast ratio are improved and, therefore, superior display characteristics can be achieved.

What is claimed is:
1. A liquid crystal display device comprising:
   a liquid crystal cell that includes first and second transparent substrates having inner surface sides that face each other with a liquid crystal layer therebetween, a first transparent electrode and a first orientation film disposed in that order on the inner surface side of the first transparent substrate, and a second transparent electrode and a second orientation film disposed in that order on the inner surface side of the second transparent substrate;
   first and second phase difference plates and a first polarizing plate formed sequentially on an outer surface side of the second transparent substrate;

a reflector attached to an outer surface side of the first transparent substrate with an adhesive layer therebetween, the reflector including a metal reflection film formed on a base material, the base material having a plurality of concave portions formed on a surface thereof and the metal reflection film having a plurality of concave surfaces corresponding to the concave portions, the metal reflection film having a thickness of about 5 to 50 nm and attached to the liquid crystal cell such that the metal reflection film is more proximate to the first transparent substrate than the base material; and a third phase difference plate and a second polarizing plate formed sequentially on the outer surface side of the first transparent substrate, the third phase difference plate and second polarizing plate disposed more distal to the liquid crystal cell than the reflector.

2. The liquid crystal display device according to claim 1, wherein:

the liquid crystal layer has a helical structure twisted about 240 degrees to 250 degrees in a thickness direction, and a retardation ($\Delta nd_{LC}$) of the liquid crystal cell is about 600 nm to 800 nm;

when an orientation direction a of the second orientation film and an orientation direction b of the first orientation film are viewed from an incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 100 nm to 200 nm, and an angle ($\phi_{RF1}$), which a lagging phase axis β of the first phase difference plate forms with respect to the normal direction X, is about 60 degrees to 100 degrees counterclockwise when viewed from the incident side of the light;

a retardation ($\Delta nd_{RF}2$) of the second phase difference plate adjacent to the first polarizing plate is about 300 nm to 500 nm, and an angle ($\phi_{RF2}$), which a lagging phase axis γ of the second phase difference plate forms with respect to the normal direction X, is about 90 degrees to 140 degrees counterclockwise when viewed from the incident side of the light;

a retardation ($\Delta nd_{RF}3$) of the third phase difference plate adjacent to the first transparent substrate is about 132.5 nm to 142.5 nm, and an angle ($\phi_{RF3}$), which a lagging phase axis δ of the third phase difference plate forms with respect to the normal direction X, is about 80 degrees to 110 degrees counterclockwise when viewed from the incident side of the light;

an angle ($\phi_{pol1}$), which an absorption axis a of the first polarizing plate forms with respect to the normal direction X, is about 20 degrees to 70 degrees or about 110 degrees to 160 degrees counterclockwise when viewed from the incident side of the light; and an angle ($\phi_{pol2}$), which an absorption axis ε of the second polarizing plate forms with respect to the normal direction X, is about 23 degrees to 43 degrees counterclockwise when viewed from the incident side of the light.

3. The liquid crystal display device according to claim 1, wherein:

the liquid crystal layer has a helical structure twisted about 240 degrees in a thickness direction, and a retardation ($\Delta nd_{LC}$) of the liquid crystal cell is about 700 nm;

when an orientation direction a of the second orientation film and an orientation direction b of the first orientation film are viewed from a incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 170 nm, and an angle ($\phi_{RF1}$), which a lagging phase axis β of the first phase difference plate forms with respect to the normal direction X, is 80 degrees counterclockwise when viewed from the incident side of the light;

a retardation ($\Delta nd_{RF2}$) of the second phase difference plate adjacent to the first polarizing plate is about 425 nm, and an angle ($\phi_{RF2}$), which a lagging phase axis γ of the second phase difference plate forms with respect to the normal direction X, is about 113 degrees counterclockwise when viewed from the incident side of the light;

a retardation ($\Delta nd_{RF3}$) of the third phase difference plate adjacent to the first transparent substrate is about 137.5 nm, and an angle ($\phi_{RF3}$), which a lagging phase axis δ of the third phase difference plate forms with respect to the normal direction X, is about 90 degrees counterclockwise when viewed from the incident side of the light;

an angle ($\phi_{pol1}$), which an absorption axis α of the first polarizing plate forms with respect to the normal direction X, is about 42 degrees counterclockwise when viewed from the incident side of the light; and an angle ($\phi_{pol2}$), which an absorption axis ε of the second polarizing plate forms with respect to the normal direction X, is about 33 degrees counterclockwise when viewed from the incident side of the light.

4. The liquid crystal display device according to claim 1, wherein:

the liquid crystal layer has a helical structure twisted about 240 degrees to 250 degrees in a thickness direction, and a retardation ($\Delta nd_{LC}$) of the liquid crystal cell is about 600 nm to 800 nm;

when an orientation direction a of the second orientation film and an orientation direction b of the first orientation film are viewed from an incident side of light, a normal direction X between the orientation directions a and b passes at an angle of half an interior angle formed by a cross-point O of the orientation directions a and b and the orientation directions a and b;

a retardation ($\Delta nd_{RF}1$) of the first phase difference plate adjacent to the second transparent substrate is about 100 nm to 200 nm, and an angle ($\phi_{RF1}$), which a lagging phase axis β of the first phase difference plate forms with respect to the normal direction X, is about 60 degrees to 100 degrees counterclockwise when viewed from the incident side of the light;

a retardation ($\Delta nd_{Rp2}$) of the second phase difference plate adjacent to the first polarizing plate is about 300 nm to 500 nm, and an angle ($\phi_{RF2}$), which a lagging phase axis γ of the second phase difference plate forms with respect to the normal direction X, is about 90 degrees to 140 degrees counterclockwise when viewed from the incident side of the tight;

a retardation ($\Delta nd_{RF3}$) of the third phase difference plate adjacent to the first transparent substrate is about 120 nm to 130 nm, and an angle ($\phi_{RF3}$), which a lagging phase axis δ of the third phase difference plate forms with respect to the normal direction X, is about 48 degrees to 68 degrees counterclockwise when viewed from the incident side of the light;

an angle ($\phi_{pol1}$), which an absorption axis a of the first polarizing plate forms with respect to the normal direction X, is about 20 degrees to 70 degrees or about 110 degrees to 160 degrees counterclockwise when viewed from the incident side of the light; and an angle ($\phi_{pol2}$), which an absorption axis ε of the second polarizing plate forms with respect to the normal direction X, is about 3 degrees to 23 degrees counterclockwise when viewed from the incident side of the light.

5. The liquid crystal display device according to claim 1, wherein:

the liquid crystal layer has a helical structure twisted about 240 degrees in a thickness direction, and a retardation ($\Delta nd_{LC}$) of the liquid crystal cell is about 700 nm;

when an orientation direction a of the second orientation film and an orientation direction b of the first orientation film are viewed from the incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 170 nm, and an angle ($\phi_{RF1}$), which a lagging phase axis β of the first phase difference plate forms with respect to the normal direction X, is about 80 degrees counterclockwise when viewed from the incident side of the light;

a retardation ($\Delta nd_{RF2}$) of the second phase difference plate adjacent to the first polarizing plate is about 425 nm, and an angle ($\phi_{RF2}$), which a lagging phase axis γ of the second phase difference plate forms with respect to the normal direction X, is about 113 degrees counterclockwise when viewed from the incident side of the light;

a retardation ($\Delta nd_{RF3}$) of the third phase difference plate adjacent to the first transparent substrate is about 125 nm, and an angle ($\phi_{RF3}$), which a lagging phase axis δ of the third phase difference plate forms with respect to the normal direction X, is about 58 degrees counterclockwise when viewed from the incident side of the light;

an angle ($\phi_{pol1}$), which an absorption axis a of the first polarizing plate forms with respect to the normal direction X, is about 42 degrees counterclockwise when viewed from the incident side of the light; and an angle ($\phi_{pol2}$), which an absorption axis ε of the second polarizing plate forms with respect to the normal direction X, is about 13 degrees counterclockwise when viewed from the incident side of the light.

6. The liquid crystal display device according to claim 1, wherein a $N_z$ coefficient represented by Formula (1) of the first phase difference plate is about −0.5 to 2.0, and a $N_z$ coefficient represented by Formula (1) of the second phase difference plate is about −0.5 to 2.0:

$$N_z=(n_x-n_z)/(n_x-n_y) \quad \text{Formula (1)}$$

(In the formula, $n_x$ denotes a refractive index in an X axis direction of the respective phase difference plate, $n_y$ denotes a refractive index in a Y axis direction of the respective phase difference plate, and $n_z$ denotes a refractive index in a Z axis direction of the respective phase difference plate).

7. The liquid crystal display device according to claim 6, wherein the $N_z$ coefficient represented by the Formula (1) of the first phase difference plate is about 0.5, and the $N_z$ coefficient represented by the Formula (1) of the second phase difference plate is about 0.3.

8. The liquid crystal display device according to claim 1, wherein the plurality of concave surfaces of the metal reflection film are formed continuously, and each concave surface is a part of a sphere.

9. The liquid crystal display device according to claim 8, wherein depths of the plurality of concave portions are about 0.1 μm to 3 μm, angles of inclination of the concave portion inner surfaces are about −30 degrees to +30 degrees, and pitches between adjacent concave portions are about 5 μm to 50 μm.

10. The liquid crystal display device according to claim 1, wherein:

the plurality of concave portions include: a first longitudinal section and a second longitudinal section, each of the first and second longitudinal sections intersecting a deepest point of the concave portion;

a shape of an inner surface of the first longitudinal section comprises a first curve from a first peripheral portion of the concave portion to the deepest point and a second curve from the deepest point to a second peripheral portion of the concave portion extending from the first curve, and an average value of absolute values of angles of inclination of the first curve with respect to the base material surface is larger than an average value of absolute values of angles of inclination of the second curve with respect to the base material surface;

the second longitudinal section is orthogonal to the first longitudinal section, and a shape of an inner surface of the second longitudinal section comprises a shallow type curve and deep type curves on both sides of the shallow type curve and having radii of curvature smaller than a radius of curvature of the shallow type curve.

11. The liquid crystal display device according to claim 10, wherein the plurality of concave portions are formed such that each of the first longitudinal sections and the second longitudinal sections is in the same direction and each of the first curves is orientated unidirectionally, and the reflector is disposed such that the first curves in respective concave portions are located above the second curves when viewed by an observer.

12. The liquid crystal display device according to claim 10, wherein the angles of inclination of the first curve and the second curve are about zero with respect to the base material surface at a position where the first and second curves are in contact with each other.

13. The liquid crystal display device according to claim 10, wherein depths of the plurality of concave portions are about 0.1 μm to 3 μm and are randomly formed.

14. The liquid crystal display device according to claim 10, wherein the plurality of concave portions are disposed randomly adjacently to each other.

15. The liquid crystal display device according to claim 10, wherein reflectance of the reflector reaches a peak at an angle of specular reflection with respect to the metal reflection film surface, an integral of the reflectance within a range of reflection angle smaller than the angle of the specular reflection and an integral of the reflectance within a range of the reflection angle larger than the angle of the specular reflection are different, and the range of the reflection angle of the reflector in which the integral of the reflectance is large is above the angle of the specular reflection with respect to the metal reflection film surface when viewed by the observer.

16. The liquid crystal display device according to claim 1, further comprising a color filter disposed between the first transparent substrate and the first transparent electrode.

17. The liquid crystal display device according to claim 1, further comprising a backlight disposed on the outer surface side of the first transparent substrate more distal to the first transparent substrate than the reflector.

18. A liquid crystal display device comprising:
a liquid crystal cell that includes first and second transparent substrates having inner surface sides that face each other with a liquid crystal layer therebetween, a first transparent electrode and a first orientation film disposed in that order on the inner surface side of the first transparent substrate, and a second transparent electrode and a second orientation film disposed in that order on the inner surface side of the second transparent substrate;
first and second phase difference plates and a first polarizing plate formed sequentially on an outer surface side of the second transparent substrate; and
a reflector attached to an outer surface side of the first transparent substrate with an adhesive layer therebetween, the first and second phase difference plates and first polarizing plate being the only phase difference and polarizing plates disposed between the reflector and a surface of the liquid crystal display device most proximate to an observer, the reflector including a metal reflection film formed on a base material, the base material having a plurality of concave portions formed on a surface thereof and the metal reflection film having a plurality of concave surfaces corresponding to the concave portions, the metal reflection film having a thickness of about 5 to 50 nm and attached to the liquid crystal cell such that the metal reflection film is more proximate to the first transparent substrate than the base material,
wherein the plurality of concave surfaces of the metal reflection film are formed continuously, each concave surface is a part of a sphere, depths of the plurality of concave portions are about 0.1 μm to 3 μm, angles of inclination of the concave portion inner surfaces are about −30 decrees to +30 degrees, and pitches between adjacent concave portions are about 5 μm to 50 μm.

19. The liquid crystal display device according to claim 18, further comprising a third phase difference plate and a second polarizing plate formed sequentially on the outer surface side of the first transparent substrate, the third phase difference plate and second polarizing plate disposed more distal to the liquid crystal cell than the reflector.

20. The liquid crystal display device according to claim 19 wherein:
the liquid crystal layer has a helical structure twisted about 240 degrees to 250 degrees in a thickness direction, and a retardation ($\Delta nd_{LC}$) of the liquid crystal cell is about 600 nm to 800 nm;
when an orientation direction a of the second orientation film and an orientation direction b of the first orientation film are viewed from an incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 100 nm to 200 nm, and an angle ($\phi_{RF1}$), which a lagging phase axis β of the first phase difference plate forms with respect to the normal direction X, is about 60 degrees to 100 degrees counterclockwise when viewed from the incident side of the light;
a retardation ($\Delta nd_{RF2}$) of the second phase difference plate adjacent to the first polarizing plate is about 300 nm to 500 nm, and an angle ($\phi_{RF2}$), which a lagging phase axis γ of the second phase difference plate forms with respect to the normal direction X, is about 90 degrees to 140 degrees counterclockwise when viewed from the incident side of the light;
a retardation ($\Delta nd_{RF3}$) of the third phase difference plate adjacent to the first transparent substrate is about 132.5 nm to 142.5 nm, and an angle ($\phi_{RF3}$), which a lagging phase axis δ of the third phase difference plate forms with respect to the normal direction X, is about 80 degrees to 110 degrees counterclockwise when viewed from the incident side of the light;
an angle ($\phi_{pol1}$), which an absorption axis a of the first polarizing plate forms with respect to the normal direction X, is about 20 degrees to 70 degrees or about 110 degrees to 160 degrees counterclockwise when viewed from the incident side of the light; and
an angle ($\phi_{pol2}$), which an absorption axis ε of the second polarizing plate forms with respect to the normal direction X, is about 23 degrees to 43 degrees counterclockwise when viewed from the incident side of the light.

21. The liquid crystal display device according to claim 19, wherein:
the liquid crystal layer has a helical structure twisted about 240 degrees in a thickness direction, and a retardation ($\Delta nd_{LC}$) of the liquid crystal cell is about 700 nm;
when an orientation direction a of the second orientation film and an orientation direction b of the first orientation film are viewed from a incident side of light, a normal direction X between the orientation directions a and b passes at an angle of half an interior angle formed by a cross-point O of the orientation directions a and b and the orientation directions a and b;
a retardation ($\Delta nd_{RF1}$) of the first phase difference plate adjacent to the second transparent substrate is about 170 nm, and an angle ($\phi_{RF1}$), which a lagging phase axis β of the first phase difference plate forms with respect to the normal direction X, is about 80 degrees counterclockwise when viewed from the incident side of the light;
a retardation ($\Delta nd_{RF2}$) of the second phase difference plate adjacent to the first polarizing plate is about 425 nm, and an angle ($\phi_{RF2}$), which a lagging phase axis γ of the second phase difference plate forms with respect to the normal direction X, is about 113 degrees counterclockwise when viewed from the incident side of the light;
a retardation ($\Delta nd_{RF3}$) of the third phase difference plate adjacent to the first transparent substrate is about 137.5 nm, and an angle ($\phi_{RF3}$), which a lagging phase axis δ of the third phase difference plate forms with respect to the normal direction X, is about 90 degrees counterclockwise when viewed from the incident side of the light;
an angle ($\phi_{pol1}$), which an absorption axis a of the first polarizing plate forms with respect to the normal direction X, is about 42 degrees counterclockwise when viewed from the incident side of the light; and an angle ($\phi_{pol2}$), which an absorption axis ε of the second polarizing plate forms with respect to the normal direction X, is about 33 degrees counterclockwise when viewed from the incident side of the light.

22. The liquid crystal display device according to claim 19, wherein:

the liquid crystal layer has a helical structure twisted about 240 degrees to 250 degrees in a thickness direction, and a retardation ($\Delta nd_{LC}$) of the liquid crystal cell is about 600 nm to 800 nm;

when an orientation direction a of the second orientation film and an orientation direction b of the first orientation film are viewed from an incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 100 nm to 200 nm, and an angle ($\phi_{RF1}$), which a lagging phase axis β of the first phase difference plate forms with respect to the normal direction X, is about 60 degrees to 100 degrees counterclockwise when viewed from the incident side of the light;

a retardation ($\Delta nd_{RF2}$) of the second phase difference plate adjacent to the first polarizing plate is about 300 nm to 500 nm, and an angle ($\phi_{RF2}$), which a lagging phase axis γ of the second phase difference plate forms with respect to the normal direction X, is about 90 degrees to 140 degrees counterclockwise when viewed from the incident side of the light;

a retardation ($\Delta nd_{RF3}$) of the third phase difference plate adjacent to the first transparent substrate is about 120 nm to 130 nm, and an angle ($\phi_{RF3}$), which a lagging phase axis δ of the third phase difference plate forms with respect to the normal direction X, is about 48 degrees to 68 degrees counterclockwise when viewed from the incident side of the light;

an angle ($\phi_{pol1}$), which an absorption axis α of the first polarizing plate forms with respect to the normal direction X, is about 20 degrees to 70 degrees or about 110 degrees to 160 degrees counterclockwise when viewed from the incident side of the light; and an angle ($\phi_{pol2}$), which an absorption axis ε of the second polarizing plate forms with respect to the normal direction X, is about 3 degrees to 23 degrees counterclockwise when viewed from the incident side of the light.

23. The liquid crystal display device according to claim 19, wherein:

the liquid crystal layer has a helical structure twisted about 240 degrees in a thickness direction, and a retardation ($\Delta nd_{LC}$) of the liquid crystal cell is about 700 nm;

when an orientation direction a of the second orientation film and an orientation direction b of the first orientation film are viewed from the incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 170 nm, and an angle ($\phi_{RF1}$), which a lagging phase axis β of the first phase difference plate forms with respect to the normal direction X, is about 80 degrees counterclockwise when viewed from the incident side of the light;

a retardation ($\Delta nd_{RF2}$) of the second phase difference plate adjacent to the first polarizing plate is about 425 nm, and an angle ($\phi_{RF2}$), which a lagging phase axis γ of the second phase difference plate forms with respect to the normal direction X, is about 113 degrees counterclockwise when viewed from the incident side of the light;

a retardation ($\Delta nd_{RF3}$) of the third phase difference plate adjacent to the first transparent substrate is about 125 nm, and an angle ($\phi_{RF3}$), which a lagging phase axis δ of the third phase difference plate forms with respect to the normal direction X, is about 58 degrees counterclockwise when viewed from the incident side of the light;

an angle ($\phi_{pol1}$), which an absorption axis α of the first polarizing plate forms with respect to the normal direction X, is about 42 degrees counterclockwise when viewed from the incident side of the light; and an angle ($\phi_{pol2}$), which an absorption axis ε of the second polarizing plate forms with respect to the normal direction X, is about 13 degrees counterclockwise when viewed from the incident side of the light.

24. The liquid crystal display device according to claim 18, wherein a $N_z$ coefficient represented by Formula (1) of the first phase difference plate is about −0.5 to 2.0, and a $N_z$ coefficient represented by Formula (1) of the second phase difference plate is about −0.5 to 2.0:

$$N_z=(n_x-n_z)/(n_x-n_y) \qquad \text{Formula (1)}$$

(In the formula, $n_x$ denotes a refractive index in an X axis direction of the respective phase difference plate, $n_y$ denotes a refractive index in a Y axis direction of the respective phase difference plate, and $n_z$ denotes a refractive index in a Z axis direction of the respective phase difference plate).

25. The liquid crystal display device according to claim 24, wherein the $N_z$ coefficient represented by the Formula (1) of the first phase difference plate is about 0.5, and the $N_z$ coefficient represented by the Formula (1) of the second phase difference plate is about 0.3.

26. The liquid crystal display device according to claim 18, wherein:

the plurality of concave portions include a first longitudinal section and a second longitudinal section, each of the first and second longitudinal sections intersecting a deepest point of the concave portion;

an inner surface of the first longitudinal section comprises a first curve from a first peripheral portion of the concave portion to the deepest point and a second curve from the deepest point to a second peripheral portion of the concave portion, and an average value of absolute values of angles of inclination of the first curve with respect to the base material surface is larger than an average value of absolute values of angles of inclination of the second curve with respect to the base material surface;

the second longitudinal section is orthogonal to the first longitudinal section, and an inner surface of the second longitudinal section comprises a shallow curve and deep curves on both sides of the shallow curve and having radii of curvature smaller than a radius of curvature of the shallow curve.

27. The liquid crystal display device according to claim 26, wherein the plurality of concave portions are formed such that each of the first longitudinal sections and the second longitudinal sections is in the same direction and each of the first curves is orientated unidirectionally, and the reflector is disposed such that the first curves in respective concave portions are located above the second curves when viewed by the observer.

28. The liquid crystal display device according to claim 26, wherein the angles of inclination of the first curve and the second curve are about zero with respect to the base material surface at a position where the first and second curves are in contact with each other.

29. The liquid crystal display device according to claim 26, wherein depths of the plurality of concave portions are about 0.1 µm to 3 µm and are randomly formed.

30. The liquid crystal display device according to claim 26, wherein the plurality of concave portions are disposed randomly and adjacently to each other.

31. The liquid crystal display device according to claim 26, wherein reflectance of the reflector reaches a peak at an angle of specular reflection with respect to the metal reflection film surface, an integral of the reflectance within a range of reflection angle smaller than the angle of the specular reflection and an integral of the reflectance within a range of the reflection angle larger than the angle of the specular reflection are different, and the range of the reflection angle of the reflector in which the integral of the reflectance is large is above the angle of the specular reflection with respect to the metal reflection film surface when viewed by the observer.

32. The liquid crystal display device according to claim 18, further comprising a color filter disposed between the first transparent substrate and the first transparent electrode.

33. The liquid crystal display device according to claim 18, further comprising a backlight disposed on the outer surface side of the first transparent substrate more distal to the first transparent substrate than the reflector.

34. A liquid crystal display device comprising:
a liquid crystal cell that includes first and second transparent substrates having inner surface sides that face each other with a liquid crystal layer therebetween, a first transparent electrode and a first orientation film disposed in that order on the inner surface side of the first transparent substrate, and a second transparent electrode and a second orientation film disposed in that order on the inner surface side of the second transparent substrate;
first and second phase difference plates and a first polarizing plate formed sequentially on an outer surface side of the second transparent substrate; and
a reflector attached to an outer surface side of the first transparent substrate with an adhesive layer therebetween, the first and second phase difference plates and first polarizing plate being the only phase difference and polarizing plates disposed between the reflector and a surface of the liquid crystal display device most proximate to an observer, the reflector including a metal reflection film formed on a base material, the base material having a plurality of concave portions formed on a surface thereof and the metal reflection film having a plurality of concave surfaces corresponding to the concave portions, the metal reflection film having a thickness of about 5 to 50 nm and attached to the liquid crystal cell such that the metal reflection film is more proximate to the first transparent substrate than the base material,
wherein:
the plurality of concave portions include a first longitudinal section and a second longitudinal section, each of the first and second longitudinal sections intersecting a deepest point of the concave portion;
an inner surface of the first longitudinal section comprises a first curve from a first peripheral portion of the concave portion to the deepest point and a second curve from the deepest point to a second peripheral portion of the concave portion, and an average value of absolute values of angles of inclination of the first curve with respect to the base material surface is larger than an average value of absolute values of angles of inclination of the second curve with respect to the base material surface;
the second longitudinal section is orthogonal to the first longitudinal section, and an inner surface of the second longitudinal section comprises a shallow curve and deep curves on both sides of the shallow curve and having radii of curvature smaller than a radius of curvature of the shallow curve.

35. The liquid crystal display device according to claim 34, further comprising a third phase difference plate and a second polarizing plate formed sequentially on the outer surface side of the first transparent substrate, the third phase difference plate and second polarizing plate disposed more distal to the liquid crystal cell than the reflector.

36. The liquid crystal display device according to claim 35, wherein:
the liquid crystal layer has a helical structure twisted about 240 degrees to 250 degrees in a thickness direction, and a retardation ($\Delta nd_{LC}$) of the liquid crystal cell is about 600 nm to 800 nm;
when an orientation direction a of the second orientation film and an orientation direction b of the first orientation film are viewed from an incident side of light, a normal direction X between the orientation directions a and b passes at an angle of half an interior angle formed by a cross-point O of the orientation directions a and b and the orientation directions a and b;
a retardation ($\Delta nd_{RF1}$) of the first phase difference plate adjacent to the second transparent substrate is about 100 nm to 200 nm, and an angle ($\phi_{RF1}$), which a lagging phase axis β of the first phase difference plate forms with respect to the normal direction X, is about 60 degrees to 100 degrees counterclockwise when viewed from the incident side of the light;
a retardation ($\Delta nd_{RF2}$) of the second phase difference plate adjacent to the first polarizing plate is about 300 nm to 500 nm, and an angle ($\phi_{RF2}$), which a lagging phase axis γ of the second phase difference plate forms with respect to the normal direction X, is about 90 degrees to 140 degrees counterclockwise when viewed from the incident side of the light;
a retardation ($\Delta nd_{RF3}$) of the third phase difference plate adjacent to the first transparent substrate is about 132.5 nm to 142.5 nm, and an angle ($\phi_{RF3}$), which a lagging phase axis δ of the third phase difference plate forms with respect to the normal direction X, is about 80 degrees to 110 degrees counterclockwise when viewed from the incident side of the light;
an angle ($\phi_{pol1}$), which an absorption axis a of the first polarizing plate forms with respect to the normal direction X, is about 20 degrees to 70 degrees or about 110 degrees to 160 degrees counterclockwise when viewed from the incident side of the light; and an angle ($\phi_{pol2}$), which an absorption axis ε of the second polarizing plate forms with respect to the normal direction X, is about 23 degrees to 43 degrees counterclockwise when viewed from the incident side of the light.

37. The liquid crystal display device according to claim 35 wherein:

the liquid crystal layer has a helical structure twisted about 240 degrees in a thickness direction, and a retardation ($\Delta nd_{LC}$) of the liquid crystal cell is about 700 nm;

when an orientation direction a of the second orientation film and an orientation direction b of the first orientation film are viewed from a incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 170 nm, and an angle ($\phi_{RF1}$), which a lagging phase axis β of the first phase difference plate forms with respect to the normal direction X, is about 80 degrees counterclockwise when viewed from the incident side of the light;

a retardation ($\Delta nd_{RF2}$) of the second phase difference plate adjacent to the first polarizing plate is about 425 nm, and an angle ($\phi_{RF2}$), which a lagging phase axis δ of the second phase difference plate forms with respect to the normal direction X, is about 113 degrees counterclockwise when viewed from the incident side of the light;

a retardation ($\Delta nd_{RF3}$) of the third phase difference plate adjacent to the first transparent substrate is about 137.5 nm, and an angle ($\phi_{RF3}$), which a lagging phase axis δ of the third phase difference plate forms with respect to the normal direction X, is about 90 degrees counterclockwise when viewed from the incident side of the light;

an angle ($\phi_{pol1}$), which an absorption axis α of the first polarizing plate forms with respect to the normal direction X, is about 42 degrees counterclockwise when viewed from the incident side of the light; and an angle ($\phi_{pol2}$), which an absorption axis ε of the second polarizing plate forms with respect to the normal direction X, is about 33 degrees counterclockwise when viewed from the incident side of the light.

38. The liquid crystal display device according to claim 35, wherein:

the liquid crystal layer has a helical structure twisted about 240 degrees to 250 degrees in a thickness direction, and a retardation ($\Delta nd_{LC}$) of the liquid crystal cell is about 600 nm to 800 nm;

when an orientation direction a of the second orientation film and an orientation direction b of the first orientation film are viewed from an incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 100 nm to 200 nm, and an angle ($\phi_{RF1}$), which a lagging phase axis β of the first phase difference plate forms with respect to the normal direction X, is about 60 degrees to 100 degrees counterclockwise when viewed from the incident side of the light;

a retardation ($\Delta nd_{RF2}$) of the second phase difference plate adjacent to the first polarizing plate is about 300 nm to 500 nm, and an angle ($\phi_{RF2}$), which a lagging phase axis γ of the second phase difference plate forms with respect to the normal direction X, is about 90 degrees to 140 degrees counterclockwise when viewed from the incident side of the light;

a retardation ($\Delta nd_{RF3}$) of the third phase difference plate adjacent to the first transparent substrate is about 120 nm to 130 nm, and an angle ($\phi_{RF3}$), which a lagging phase axis δ of the third phase difference plate forms with respect to the normal direction X, is about 48 degrees to 68 degrees counterclockwise when viewed from the incident side of the light;

an angle ($\phi_{pol1}$), which an absorption axis a of the first polarizing plate forms with respect to the normal direction X, is about 20 degrees to 70 degrees or about 110 degrees to 160 degrees counterclockwise when viewed from the incident side of the light; and an angle ($\phi_{pol2}$), which an absorption axis ε of the second polarizing plate forms with respect to the normal direction X, is about 3 degrees to 23 degrees counterclockwise when viewed from the incident side of the light.

39. The liquid crystal display device according to claim 35, wherein:

the liquid crystal layer has a helical structure twisted about 240 degrees in a thickness direction, and a retardation ($\Delta nd_{LC}$) of the liquid crystal cell is about 700 nm;

when an orientation direction a of the second orientation film and an orientation direction b of the first orientation film are viewed from the incident side of light, a normal direction X between the orientation directions a and b passes at an angle of half an interior angle formed by a cross-point O of the orientation directions a and b and the orientation directions a and b;

a retardation ($\Delta nd_{RF1}$) of the first phase difference plate adjacent to the second transparent substrate is about 170 nm, and an angle ($\phi_{RF1}$), which a lagging phase axis β of the first phase difference plate forms with respect to the normal direction X, is about 80 degrees counterclockwise when viewed from the incident side of the light;

a retardation ($\Delta nd_{RF2}$) of the second phase difference plate adjacent to the first polarizing plate is about 425 nm, and an angle ($\phi_{RF2}$), which a lagging phase axis γ of the second phase difference plate forms with respect to the normal direction X, is about 113 degrees counterclockwise when viewed from the incident side of the light;

a retardation ($\Delta nd_{RF3}$) of the third phase difference plate adjacent to the first transparent substrate is about 125 nm, and an angle ($\phi_{RF3}$), which a lagging phase axis δ of the third phase difference plate forms with respect to the normal direction X, is about 58 degrees counterclockwise when viewed from the incident side of the light;

an angle ($\phi_{pol1}$), which an absorption axis α of the first polarizing plate forms with respect to the normal direction X, is about 42 degrees counterclockwise when viewed from the incident side of the light; and an angle ($\phi_{pol2}$), which an absorption axis ε of the second polarizing plate forms with respect to the normal direction X, is about 13 degrees counterclockwise when viewed from the incident side of the light.

40. The liquid crystal display device according to claim 34, wherein a $N_z$ coefficient represented by Formula (1) of the first phase difference plate is about −0.5 to 2.0, and a $N_z$ coefficient represented by Formula (1) of the second phase difference plate is about −0.5 to 2.0:

$$N_z=(n_x-n_z)/(n_x-n_y) \quad \text{Formula (1)}$$

(In the formula, $n_x$ denotes a refractive index in an X axis direction of the respective phase difference plate, $n_y$ denotes a refractive index in a Y axis direction of the respective phase difference plate, and $n_z$ denotes a refractive index in a Z axis direction of the respective phase difference plate).

41. The liquid crystal display device according to claim wherein the $N_z$ coefficient represented by the Formula (1) of the first phase difference plate is about 0.5, and the $N_z$ coefficient represented by the Formula (1) of the second phase difference plate is about 0.3.

42. The liquid crystal display device according to claim 34, wherein the plurality of concave surfaces of the metal reflection film are formed continuously, and each concave surface is a part of a sphere.

43. The liquid crystal display device according to claim 42, wherein depths of the plurality of concave portions are about 0.1 μm to 3 μm, angles of inclination of the concave portion inner surfaces are about −30 degrees to +30 degrees, and pitches between adjacent concave portions are about 5 μm to 50 μm.

44. The liquid crystal display device according to claim 34, wherein the plurality of concave portions are formed such that each of the first longitudinal sections and the second longitudinal sections is in the same direction and each of the first curves is orientated unidirectionally, and the reflector is disposed such that the first curves in respective concave portions are located above the second curves when viewed by the observer.

45. The liquid crystal display device according to claim 36, wherein the angles of inclination of the first curve and the second curve are about zero with respect to the base material surface at a position where the first and second curves are in contact with each other.

46. The liquid crystal display device according to claim 34, wherein depths of the plurality of concave portions are about 0.1 μm to 3 μm and are randomly formed.

47. The liquid crystal display device according to claim 34, wherein the plurality of concave portions are disposed randomly and adjacently to each other.

48. The liquid crystal display device according to claim 34, wherein reflectance of the reflector reaches a peak at an angle of specular reflection with respect to the metal reflection film surface, an integral of the reflectance within a range of reflection angle smaller than the angle of the specular reflection and an integral of the reflectance within a range of the reflection angle larger than the angle of the specular reflection are different, and the range of the reflection angle of the reflector in which the integral of the reflectance is large is above the angle of the specular reflection with respect to the metal reflection film surface when viewed by the observer.

49. The liquid crystal display device according to claim 34, further comprising a color filter disposed between the first transparent substrate and the first transparent electrode.

50. The liquid crystal display device according to claim 34, further comprising a backlight disposed on the outer surface side of the first transparent substrate more distal to the first transparent substrate than the reflector.

* * * * *